(12) United States Patent
Whitaker et al.

(10) Patent No.: US 9,846,664 B2
(45) Date of Patent: *Dec. 19, 2017

(54) RFID INTERFACE AND INTERRUPT

(71) Applicant: Cypress Semiconductor Corporation, San Jose, CA (US)

(72) Inventors: Mark R. Whitaker, Colorado Springs, CO (US); Kirk Greefkes, Colorado Springs, CO (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,798

(22) Filed: Mar. 12, 2015

(65) Prior Publication Data
US 2015/0227480 A1   Aug. 13, 2015

Related U.S. Application Data

(63) Continuation-in-part of application No. 12/833,817, filed on Jul. 9, 2010, now Pat. No. 9,092,582.

(60) Provisional application No. 62/013,375, filed on Jun. 17, 2014, provisional application No. 62/042,113, filed on Aug. 26, 2014.

(51) Int. Cl.
| | |
|---|---|
| *H04Q 5/22* | (2006.01) |
| *G06F 13/32* | (2006.01) |
| *G06K 7/10* | (2006.01) |
| *G06F 12/02* | (2006.01) |
| *G06F 13/364* | (2006.01) |
| *G06F 13/40* | (2006.01) |

(52) U.S. Cl.
CPC .......... *G06F 13/32* (2013.01); *G06F 12/0246* (2013.01); *G06F 13/364* (2013.01); *G06F 13/4068* (2013.01); *G06K 7/10366* (2013.01); *G06F 2212/2022* (2013.01)

(58) Field of Classification Search
CPC ............................ G06K 7/0008; G06F 19/322
USPC ....................................................... 340/10.51
See application file for complete search history.

(56) References Cited

U.S. PATENT DOCUMENTS

| | | | |
|---|---|---|---|
| 3,184,660 | A | 5/1965 | Preston |
| 3,569,802 | A | 3/1971 | Brauer et al. |
| 3,579,063 | A | 5/1971 | Wasa et al. |
| 3,819,990 | A | 6/1974 | Hayashi et al. |

(Continued)

FOREIGN PATENT DOCUMENTS

| | | |
|---|---|---|
| CN | 1612494 A | 5/2005 |
| DE | 4107165 A | 10/1991 |

(Continued)

OTHER PUBLICATIONS

SIPO Office Action for Application No. 201110194799.9 dated Jun. 20, 2016; 2 pages.

(Continued)

*Primary Examiner* — Vernal Brown

(57) ABSTRACT

A RFID system includes an RFID controller incorporating a serial bus master coupled via a serial bus to a serial bus slave device, whereby the RFID controller controls power supply and/or power mode of the salve device in order that the slave device is powered and able to communicate with the RFID controller in response to RFID commands received from an RFID reader, and unpowered or in a low power mode otherwise.

18 Claims, 29 Drawing Sheets

(56) References Cited

U.S. PATENT DOCUMENTS

| | | |
|---|---|---|
| 4,141,022 A | 2/1979 | Sigg et al. |
| 4,149,301 A | 4/1979 | Cook |
| 4,149,302 A | 4/1979 | Cook |
| 4,507,851 A | 4/1985 | Joyner et al. |
| 4,636,908 A | 1/1987 | Yoshihara et al. |
| 4,675,715 A | 6/1987 | Lepselter et al. |
| 4,700,457 A | 10/1987 | Matsukawa |
| 4,707,897 A | 11/1987 | Rohrer et al. |
| 4,757,028 A | 7/1988 | Kondoh et al. |
| 4,759,823 A | 7/1988 | Asselanis et al. |
| 4,809,225 A | 2/1989 | Dimmler et al. |
| 4,811,078 A | 3/1989 | Tigelaar et al. |
| 4,851,834 A | 7/1989 | Stockebrand et al. |
| 4,851,895 A | 7/1989 | Green et al. |
| 4,853,893 A | 8/1989 | Eaton et al. |
| 4,860,254 A | 8/1989 | Pott et al. |
| 4,873,644 A | 10/1989 | Fujii et al. |
| 4,873,664 A | 10/1989 | Eaton |
| 4,888,733 A | 12/1989 | Mobley |
| 4,893,272 A | 1/1990 | Eaton et al. |
| 4,910,708 A | 3/1990 | Eaton et al. |
| 4,914,627 A | 4/1990 | Eaton et al. |
| 4,918,654 A | 4/1990 | Eaton et al. |
| 4,937,650 A | 6/1990 | Shinriki et al. |
| 4,959,745 A | 9/1990 | Suguro |
| 4,982,309 A | 1/1991 | Shepherd |
| 5,003,428 A | 3/1991 | Shepherd |
| 5,005,102 A | 4/1991 | Larson |
| 5,024,964 A | 6/1991 | Rohrer et al. |
| 5,031,144 A | 7/1991 | Persky |
| 5,036,382 A | 7/1991 | Yamaha |
| 5,040,046 A | 8/1991 | Chhabra et al. |
| 5,043,049 A | 8/1991 | Takenaka |
| 5,046,043 A | 9/1991 | Miller et al. |
| 5,070,036 A | 12/1991 | Stevens |
| 5,094,981 A | 3/1992 | Chung et al. |
| 5,099,305 A | 3/1992 | Takenaka |
| 5,119,154 A | 6/1992 | Gnadinger |
| 5,122,477 A | 6/1992 | Wolters et al. |
| 5,124,014 A | 6/1992 | Foo et al. |
| 5,139,971 A | 8/1992 | Giridhar et al. |
| 5,142,437 A | 8/1992 | Kammerdiner et al. |
| 5,146,299 A | 9/1992 | Lampe et al. |
| 5,155,573 A | 10/1992 | Abe et al. |
| 5,170,242 A | 12/1992 | Stevens et al. |
| 5,189,503 A | 2/1993 | Suguro et al. |
| 5,191,510 A | 3/1993 | Huffman |
| 5,192,704 A | 3/1993 | Mcdavid et al. |
| 5,201,054 A | 4/1993 | Dudhela |
| 5,206,788 A | 4/1993 | Larson et al. |
| 5,212,620 A | 5/1993 | Evans, Jr. et al. |
| 5,216,572 A | 6/1993 | Larson et al. |
| 5,227,855 A | 7/1993 | Momose |
| 5,229,309 A | 7/1993 | Kato |
| 5,231,058 A | 7/1993 | Maeda et al. |
| 5,266,355 A | 11/1993 | Wernberg et al. |
| 5,271,955 A | 12/1993 | Maniar |
| 5,273,927 A | 12/1993 | Gnadinger |
| 5,286,681 A | 2/1994 | Maeda et al. |
| 5,293,075 A | 3/1994 | Onishi et al. |
| 5,293,510 A | 3/1994 | Takenaka |
| 5,303,186 A | 4/1994 | Yamauchi |
| 5,307,305 A | 4/1994 | Takasu |
| 5,319,246 A | 6/1994 | Nagamine et al. |
| 5,334,554 A | 8/1994 | Lin et al. |
| 5,335,138 A | 8/1994 | Sandhu et al. |
| 5,350,705 A | 9/1994 | Brassington et al. |
| 5,371,700 A | 12/1994 | Hamada |
| 5,375,085 A | 12/1994 | Gnade et al. |
| 5,376,590 A | 12/1994 | Machida et al. |
| 5,381,364 A | 1/1995 | Chern et al. |
| 5,382,817 A | 1/1995 | Kashihara et al. |
| 5,383,150 A | 1/1995 | Nakamura et al. |
| 5,390,143 A | 2/1995 | Manning |
| 5,395,095 A | 3/1995 | Marino et al. |
| 5,396,095 A | 3/1995 | Wolters et al. |
| 5,397,446 A | 3/1995 | Ishihara et al. |
| 5,400,275 A | 3/1995 | Abe et al. |
| 5,416,735 A | 5/1995 | Onishi et al. |
| 5,416,736 A | 5/1995 | Kosa et al. |
| 5,438,023 A | 8/1995 | Argos et al. |
| 5,440,173 A | 8/1995 | Evans, Jr. et al. |
| 5,459,353 A | 10/1995 | Kanazawa |
| 5,466,629 A | 11/1995 | Mihara et al. |
| 5,475,248 A | 12/1995 | Takenaka |
| 5,479,316 A | 12/1995 | Smrtic et al. |
| 5,481,490 A | 1/1996 | Watanabe et al. |
| 5,495,117 A | 2/1996 | Larson |
| 5,495,439 A | 2/1996 | Morihara |
| 5,502,321 A | 3/1996 | Matsushita |
| 5,506,748 A | 4/1996 | Hoshiba |
| 5,523,595 A | 6/1996 | Takenaka et al. |
| 5,525,528 A | 6/1996 | Perino et al. |
| 5,530,668 A | 6/1996 | Chern et al. |
| 5,532,953 A | 7/1996 | Ruesch et al. |
| 5,536,672 A | 7/1996 | Miller et al. |
| 5,554,559 A | 9/1996 | Wolters et al. |
| 5,559,052 A | 9/1996 | Lee et al. |
| 5,578,867 A | 11/1996 | Argos et al. |
| 5,583,068 A | 12/1996 | Jones et al. |
| 5,608,725 A | 3/1997 | Grube et al. |
| 5,612,238 A | 3/1997 | Sato et al. |
| 5,621,681 A | 4/1997 | Moon |
| 5,624,864 A | 4/1997 | Arita et al. |
| 5,638,319 A | 6/1997 | Onishi et al. |
| 5,679,969 A | 10/1997 | Evans, Jr. et al. |
| 5,696,394 A | 12/1997 | Jones et al. |
| 5,716,875 A | 2/1998 | Jones et al. |
| 5,731,608 A | 3/1998 | Hsu et al. |
| 5,750,419 A | 5/1998 | Zafar |
| 5,758,073 A | 5/1998 | Liang et al. |
| 5,789,303 A | 8/1998 | Leung et al. |
| 5,801,415 A | 9/1998 | Lee et al. |
| 5,804,850 A | 9/1998 | Evans, Jr. et al. |
| 5,822,175 A | 10/1998 | Azuma |
| 5,838,605 A | 11/1998 | Bailey |
| 5,851,844 A | 12/1998 | Ooms et al. |
| 5,858,851 A | 1/1999 | Yamagata et al. |
| 5,864,932 A | 2/1999 | Evans et al. |
| 5,866,926 A | 2/1999 | Takenaka |
| 5,890,199 A | 3/1999 | Downs |
| 5,902,131 A | 5/1999 | Argos et al. |
| 5,909,624 A | 6/1999 | Yeager et al. |
| 5,920,453 A | 7/1999 | Evans et al. |
| 5,953,619 A | 9/1999 | Miyazawa et al. |
| 5,960,252 A | 9/1999 | Matsuki et al. |
| 5,960,279 A | 9/1999 | Chen et al. |
| 5,963,466 A | 10/1999 | Evans, Jr. |
| 5,985,713 A | 11/1999 | Bailey |
| 6,010,927 A | 1/2000 | Jones et al. |
| 6,010,969 A | 1/2000 | Vaartstra |
| 6,020,233 A | 2/2000 | Kim |
| 6,027,947 A | 2/2000 | Evans et al. |
| 6,051,858 A | 4/2000 | Uchida et al. |
| 6,097,622 A | 8/2000 | Shimizu et al. |
| 6,128,681 A | 10/2000 | Shephard |
| 6,140,173 A | 10/2000 | Wolters et al. |
| 6,150,184 A | 11/2000 | Evans et al. |
| 6,172,386 B1 | 1/2001 | Jung et al. |
| 6,174,735 B1 | 1/2001 | Evans |
| 6,190,926 B1 | 2/2001 | Perino et al. |
| 6,201,726 B1 | 3/2001 | Evans |
| 6,211,542 B1 | 4/2001 | Eastep et al. |
| 6,218,197 B1 | 4/2001 | Kasai |
| 6,240,038 B1 | 5/2001 | Barry et al. |
| 6,242,299 B1 | 6/2001 | Hickert |
| 6,249,014 B1 | 6/2001 | Bailey |
| 6,281,023 B2 | 8/2001 | Eastep et al. |
| 6,281,534 B1 | 8/2001 | Arita et al. |
| 6,358,755 B1 | 3/2002 | Evans |
| 6,498,741 B2 | 12/2002 | Matsudera et al. |
| 6,613,586 B2 | 9/2003 | Bailey |
| 6,684,275 B1 | 1/2004 | Goldstein |
| 6,725,413 B1 | 4/2004 | Ishida |

(56) References Cited

U.S. PATENT DOCUMENTS

| | | | |
|---|---|---|---|
| 6,901,494 | B2 | 5/2005 | Zumkehr et al. |
| 7,240,848 | B1* | 7/2007 | Dressen .................... 235/492 |
| 7,405,660 | B2 | 7/2008 | Diorio et al. |
| 7,475,273 | B2 | 1/2009 | Gredone et al. |
| 7,484,662 | B2 | 2/2009 | Schmidtberg et al. |
| 7,538,678 | B2 | 5/2009 | Jung et al. |
| 7,652,637 | B2 | 1/2010 | Taki et al. |
| 7,661,010 | B2 | 2/2010 | Defazio et al. |
| 7,737,725 | B1 | 6/2010 | Ansari et al. |
| 7,742,348 | B2 | 6/2010 | Schuessler |
| 7,836,382 | B2 | 11/2010 | Dickin et al. |
| 8,686,836 | B2 | 4/2014 | Whitaker et al. |
| 8,957,763 | B2 | 2/2015 | Whitaker et al. |
| 2001/0000990 | A1 | 5/2001 | Matsudera et al. |
| 2005/0088285 | A1* | 4/2005 | Jei ........................ 340/10.51 |
| 2005/0262272 | A1 | 11/2005 | Christensen |
| 2008/0135615 | A1* | 6/2008 | Moran ............ G06K 19/07749 235/439 |
| 2008/0143487 | A1 | 6/2008 | Hulvey |
| 2009/0006675 | A1* | 1/2009 | Rofougaran .................... 710/62 |
| 2009/0059825 | A1* | 3/2009 | Rofougaran .................. 370/311 |
| 2009/0111524 | A1* | 4/2009 | Basaralu ............... G06F 1/3209 455/559 |
| 2009/0203399 | A1 | 8/2009 | Rofougaran |
| 2009/0276089 | A1 | 11/2009 | Bartholomew |
| 2011/0063091 | A1* | 3/2011 | Kang ..................... 340/10.51 |
| 2012/0007721 | A1 | 1/2012 | Whitaker et al. |
| 2012/0007722 | A1 | 1/2012 | Whitaker et al. |
| 2012/0007723 | A1 | 1/2012 | Whitaker et al. |

FOREIGN PATENT DOCUMENTS

| | | |
|---|---|---|
| EP | 448151 A | 9/1991 |
| EP | 0469934 A | 2/1992 |
| EP | 0485086 A | 5/1992 |
| EP | 0513894 A | 11/1992 |
| EP | 0642167 A | 3/1995 |
| EP | 0917204 A | 5/1999 |
| JP | 5748247 | 3/1982 |
| JP | 59110122 | 6/1984 |
| JP | 2183570 | 7/1990 |
| JP | 2186669 | 7/1990 |
| JP | 0208978 | 8/1990 |
| JP | 2232973 | 9/1990 |
| JP | 2288367 | 11/1990 |
| JP | 08335673 | 12/1996 |
| JP | 09162369 | 6/1997 |
| JP | 2000243923 | 9/2000 |

OTHER PUBLICATIONS

"Use of Conducting Oxides As a Diffusion Banier in Shallow Junction Semiconductor Devices," IBM Technical Disclosure Bulletin, vol. 30, No. 8, Jan. 1988, pp. 436-437.

Cypress Semiconductor Corporation. WM72016-6 Datasheet; Document No. 001-86227; Publication [online]. Feb. 25, 2013 [retrieved Aug. 23, 2015]. Retrieved from the Internet<URL: http://www.cypress.com/file/120726/download>.; pp. 1-33.

International Search Report for International Application No. PCT/US15/35507 dated Sep. 18, 2015; 2 pages.

SIPO Office Action for application No. 2011/10193691.8 dated May 8, 2015, 7 pages.

SIPO Office Action for Application No. 201110192932.7 dated Oct. 18, 2015; 5 pages.

SIPO Office Action for Application No. 201110193698.X dated Sep. 28, 2015; 5 pages.

TI UHF Gen2 Protocol Reference Guide, Jul. 2006, p. 21.

USPTO Advisory Action for U.S. Appl. No. 12/833,817 dated Jul. 8, 2014; 3 pages.

USPTO Advisory Action for U.S. Appl. No. 12/833,817 dated Aug. 28, 2013; 4 pages.

USPTO Final Rejection for U.S. Appl. No. 12/833,817 dated Apr. 25, 2014; 10 pages.

USPTO Final Rejection for U.S. Appl. No. 12/833,817 dated Jun. 14, 2013; 8 pages.

USPTO Final Rejection for U.S. Appl. No. 12/833,836 dated Apr. 11, 2013; 7 pages.

USPTO Final Rejection for U.S. Appl. No. 12/833,845 dated Apr. 12, 2013; 6 pages.

USPTO Non-Final Rejection for U.S. Appl. No. 12/833,817 dated Nov. 7, 2012; 5 pages.

USPTO Non-Final Rejection for U.S. Appl. No. 12/833,817 dated Dec. 6, 2013; 10 pages.

USPTO Non-Final Rejection for U.S. Appl. No. 12/833,836 dated Aug. 15, 2013; 7 pages.

USPTO Non-Final Rejection for U.S. Appl. No. 12/833,836 dated Oct. 11, 2012; 6 pages.

USPTO Non-Final Rejection for U.S. Appl. No. 12/833,845 dated Apr. 21, 2014; 10 pages.

USPTO Non-Final Rejection for U.S. Appl. No. 12/833,845 dated Jun. 20, 2013; 9 pages.

USPTO Non-Final Rejection for U.S. Appl. No. 12/833,845 dated Nov. 8, 2012; 8 pages.

USPTO Notice of Allowance for U.S. Appl. No. 12/833,817 dated Mar. 27, 2015; 7 pages.

USPTO Notice of Allowance for U.S. Appl. No. 12/833,817 dated Oct. 6, 2014; 5 pages.

USPTO Notice of Allowance for U.S. Appl. No. 12/833,836 dated Dec. 13, 2013; 7 pages.

USPTO Notice of Allowance for U.S. Appl. No. 12/833,845 dated Jan. 29, 2014; 5 pages.

USPTO Notice of Allowance for U.S. Appl. No. 12/833,845 dated Aug. 29, 2014; 5 pages.

USPTO Notice of Allowance for U.S. Appl. No. 12/833,861 dated Mar. 17, 2014; 5 pages.

USPTO Notice of Allowance for U.S. Appl. No. 12/833,861 dated Mar. 19, 2013; 6 pages.

USPTO Notice of Allowance for U.S. Appl. No. 12/833,861 dated Sep. 13, 2013; 6 pages.

W. Kinney, et al., "A Non-Volatile Memory Cell Base on Ferroelectric Storage Capacitors," IEEE Devices Meeting, Dec. 6, 1987.

Written Opinion of the International Searching Authority for International Application No. PCT/US15/35507 mailed Sep. 18, 2015; 6 pages.

U.S. Appl. No. 12/833,836: "Fast Block Write Using an Indirect Memory Pointer" Mark R. Whitaker et al., filed on Jul. 9, 2010; 37 pages.

C. Ting, "New Sturcture for Contact Metallurgy," IBM Technical Disclosure Bulleting, vol. 25, No. 12, Mar. 1983, pp. 5698-6399.

Shapman, S.P., et al., "Tuning PZT Do Fabrication Processes by Optimizing Imprint", abstract, Ninth International Symposium on Integrated Ferroelectrics, Santa Fe, New Mexico, Mar. 3, 1997.

Chin-An Chang, Deposition of (100) Au., Ag, Pt, Pb and Fe on (100) Si Using Differential Metal Seed Layers, J. Vac. Sci. Technol. A, vol. 9, No. 1, Jan./Feb. 1991.

IBM Technical Disclosure Bulletin, "Low Charging Conformal Phosphorous Silicon Glass Passivation Process," Jun. 6, 1995, p. 367.

In Seon Park, et al., "Ultra-thin EBL (Encapsulated Barrier Layer) for Ferroelectric Capacitor," IEEE, 1997, pp. 25.6.1-25.6.4.

J. Kudo, et al., "A High Stability Electrode Technology for Stacked SrBi2Ta209 Capacitors Applicable to Advanced Ferroelectric Memory," IEEE, pp. 25.4, 1-25.4.4, 1997.

J. Scott, "Ferroelectric Memory Applications," IEEE 1989 Ultrasonics Symposium, Oct. 3, 1989.

Kim, D., et al., "Effects of Substrate Modification on the Growth and Characteristics of MOCVD PZT", p. 67-79, Ninth International Symposium on Integrated Ferroelectrics, Santa Fe, New Mexico, Mar. 3, 1997.

Kim, D., et al., "MOCVD Growth and Characterization of PZT Thin Films", abstract, Ninth International Symposium on Integrated Ferroelectrics, Santa Fe, New Mexico, Mar. 1997.

(56) References Cited

OTHER PUBLICATIONS

S.F. Vogel and I.C. Barlow, "Sputtered Plantinum as Substrate for Ferroelectric Film Deposition," J. Vac. Sci. Technol., vol. 10, No. 5, Sep./Oct. 1973.
SIPO Office Action for Application No. 201110193698.X dated Feb. 16, 2016; 2 pages.
SIPO Office Action for Application No. 201110194799.9 dated Jan. 27, 2016; 3 pages.
SIPO Office Action for Application No. 201110194799.9 dated Nov. 12, 2015; 4 pages.
SIPO Office Action for Application No. 201110194799.9 dated Apr. 5, 2016; 3 pages.
USPTO Final Rejection for U.S. Appl. No. 12/833,845 dated Nov. 5, 2013; 11 pages.
USPTO Non Final Rejection for U.S. Appl. No. 12/833,861 dated Oct. 12, 2012; 6 pages.

\* cited by examiner

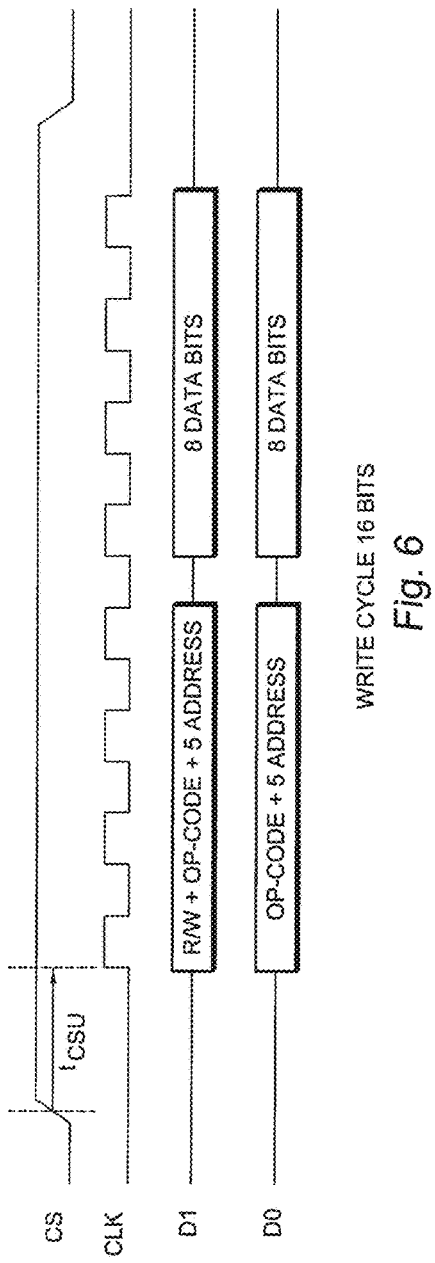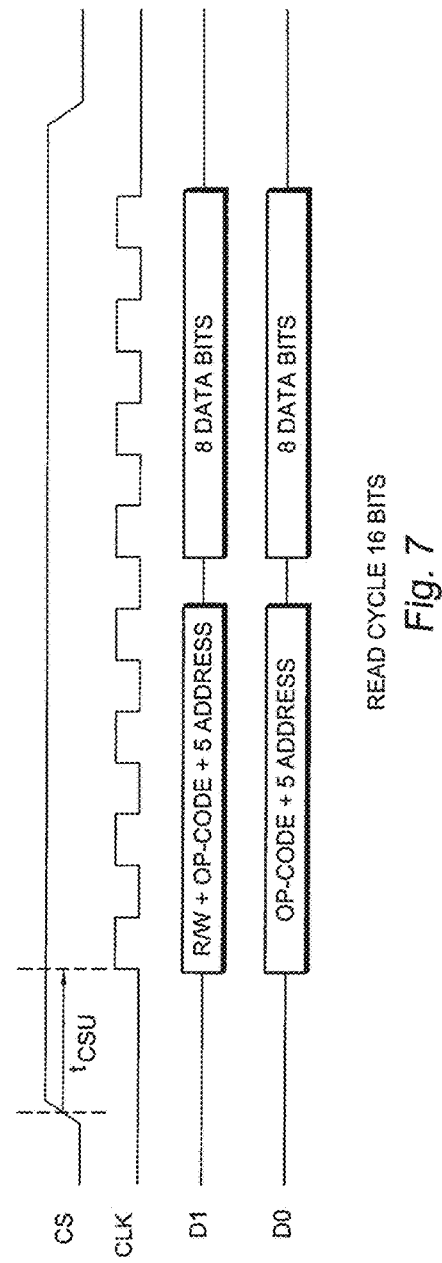

DETAILED VIEW OF THE FIRST 4 CLOCKS

DETAILED VIEW OF THE WRITE DATA

DETAILED VIEW OF THE READ DATA

* WIRELESS / RFID OPERATION

BLOCK WRITE COMMAND

| | COMMAND | MEM BANK | WORD PTR | WORD COUNT | DATA | RN | CR6-16 |
|---|---|---|---|---|---|---|---|
| # OF BITS | 8 | 2 | EBV | 8 | VARIABLE | 16 | 16 |
| DESCRIPTION | 11000111 | 00:RESERVED<br>01:EPC<br>10:TID<br>11:USER | STARTING ADDRESS POINTER | NUMBER OF WORDS TO WRITE | DATA TO BE WRITTEN | HANDLE | |

* RF/ID TRANSACTION

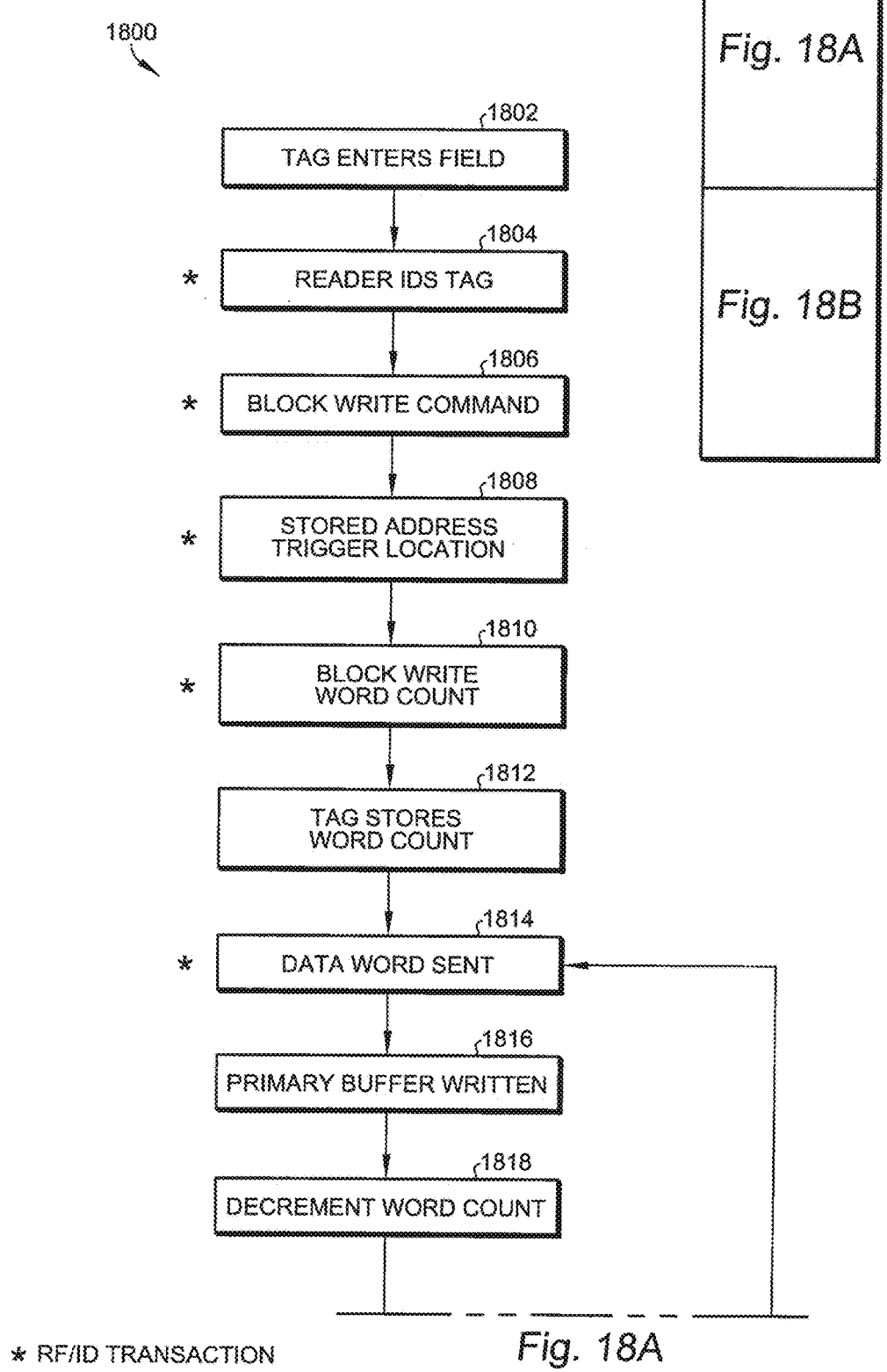

Interrupt Generation Control Command

|  | COMMAND | WORDCOUNT | DATA | RN | CRC |
|---|---|---|---|---|---|
| # OF BITS | 16 | 8 | VARIABLE | 16 | 16 |
|  | 11100000_00000001 | NUMBER OF WORDS TO WRITE | AUXILLIARY INT. DATA | HANDLE | CRC-16 |

Tag Interrupt Response Message

|  | HEADER | DATA | RN | CRC |
|---|---|---|---|---|
| # OF BITS | 1 | 8 | 16 | 16 |
|  | 0 | STATUS | HANDLE | CRC-16 |

FIG. 19D

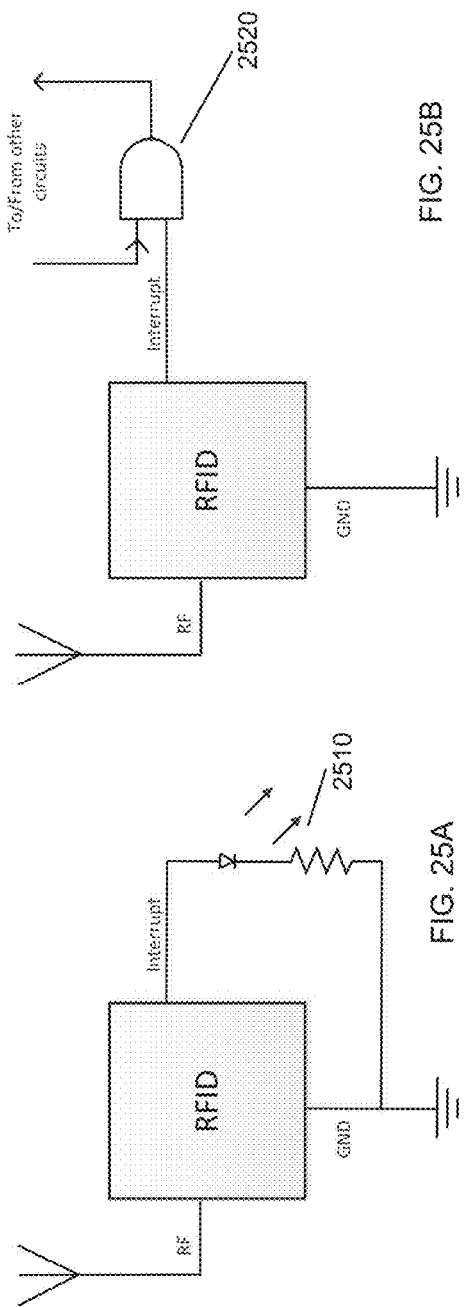
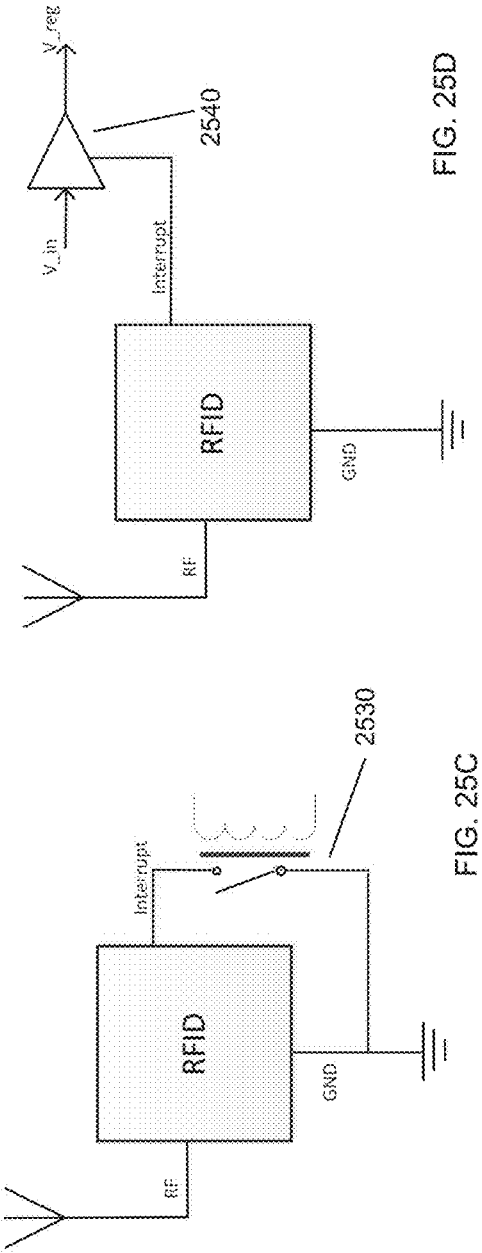

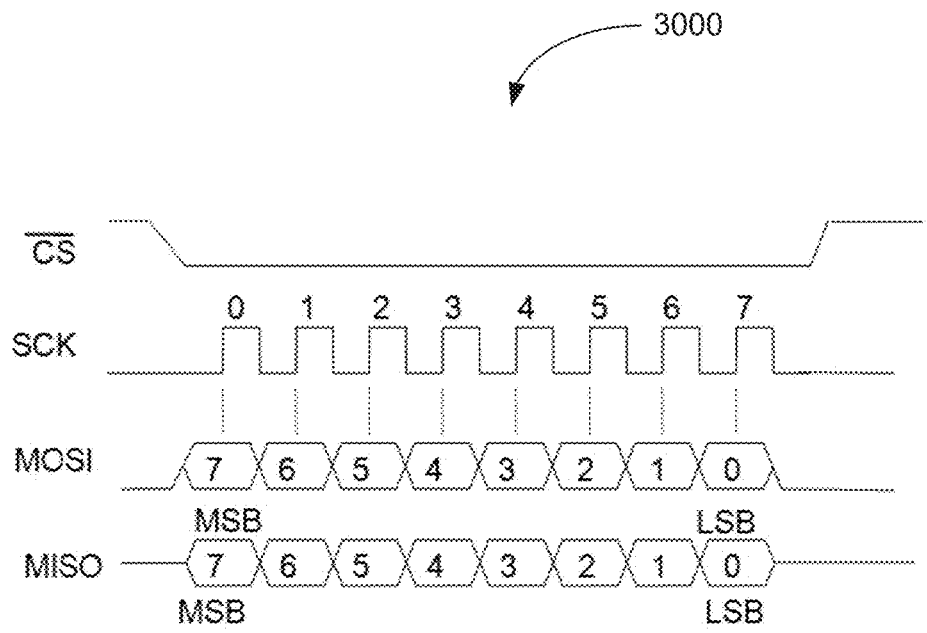
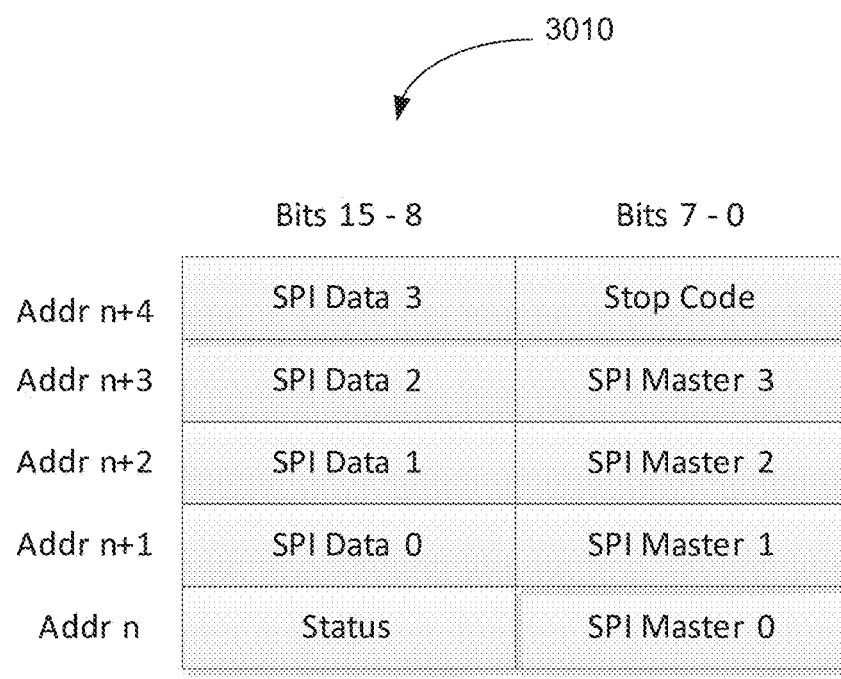
FIG. 30

US 9,846,664 B2

RFID INTERFACE AND INTERRUPT

PRIORITY

This application is a continuation-in-part of U.S. patent application Ser. No. 12/833,817, filed Jul. 9, 2010, and claims priority to U.S. Provisional Patent Application No. 62/013,375, filed Jun. 17, 2014, and U.S. Provisional Patent Application No. 62/042,113, filed Aug. 26, 2014, which are herein specifically incorporated by this reference in each of their entirety. The present application is also related to U.S. patent application Ser. No. 12/833,861 filed Jul. 9, 2010, U.S. patent application Ser. No. 12/833,836 filed Jul. 9, 2010, and U.S. patent application Ser. No. 12/833,845 filed Jul. 9, 2010, which are herein specifically incorporated by this reference in each of their entirety.

TECHNICAL FIELD

The invention relates, in general, to the field of radio frequency identification (RFID) systems. More particularly, the invention relates in part to an RFID transponder incorporating ferroelectric random access memory (FRAM). The invention also relates to a modified serial interface that has utility within and beyond RFID applications.

BACKGROUND

As is well known in the art, a basic RFID system includes three components: an antenna or coil; a transceiver with decoder, i.e., RFID reader or interrogator; and a transponder, i.e., RFID tag, programmed with unique information.

RFID tags are categorized as either active or passive. Active RFID tags are powered by an internal battery and are typically read/write, i.e., tag data can be rewritten and/or modified. Passive RFID tags operate without a separate external power source and obtain operating power generated from the RFID reader.

An example of a typical passive RFID tag is shown in FIG. 1. Tag 100 includes an antenna 102 that is coupled to an analog front end circuit 104, which is in communication with a digital and memory circuit 106 through receive (RX) and transmit (TX) paths. Most passive RFID tags today use some sort of electrically erasable programmable read-only memory (EEPROM) such as flash memory.

While EEPROM memory has served in passive RFID tag applications to date, the demands for greater data throughput into and out of the RFID are increasing. This can be seen for example in factory environments, and in collecting highway tolls. The EEPROM based passive RFID tags are slow and may not be suited for the higher throughput applications. Alternative, faster memories technologies such as FRAM exist that are ideally suited for these new higher speed RFID applications. However, the entire protocol associated with transferring data input and output of the RFID tag is, generally speaking, EEPROM-related. To take advantage of alternative memory technologies, such as FRAM, what is desired are extensions to the existing data protocol that is optimized for operating a passive RFID tag incorporating FRAM memory.

The EPC Global Generation 2 standard includes a published method of doing Block Writes to memory. This method is inefficient when considering the capability of faster memory technologies, such as FRAM memory.

SUMMARY OF THE INVENTION

Accordingly, the present invention is directed to an interrupt controller circuit for an RFID application that substantially obviates one or more of the problems due to limitations and disadvantages of the related art.

According to the present invention, a memory circuit includes a memory, a memory access control circuit coupled to the memory, an RFID interface coupled to the memory access control circuit, a secondary interface coupled to the memory access control circuit, and an interrupt manager coupled to the memory access control circuit, the RFID interface, and the secondary interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 6-10 are timing diagrams associated with the serial interface circuit shown in FIG. 5.

FIG. 16 is an EPC global BlockWrite command data structure according to the prior art.

FIGS. 18A and 18B taken together represent a flow chart of a method for implementing the BlockWrite command according to the present invention.

FIG. 19D is an example of a custom interrupt generation control command data structure and RFID tag response message.

FIGS. 25A to 25D are block diagrams of various embodiments of embedded FRAM memory based RFID circuits.

FIG. 30 is a timing chart of SPI timing and a memory structure table for a single SPI device, according to an embodiment of the invention.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Figure 1:
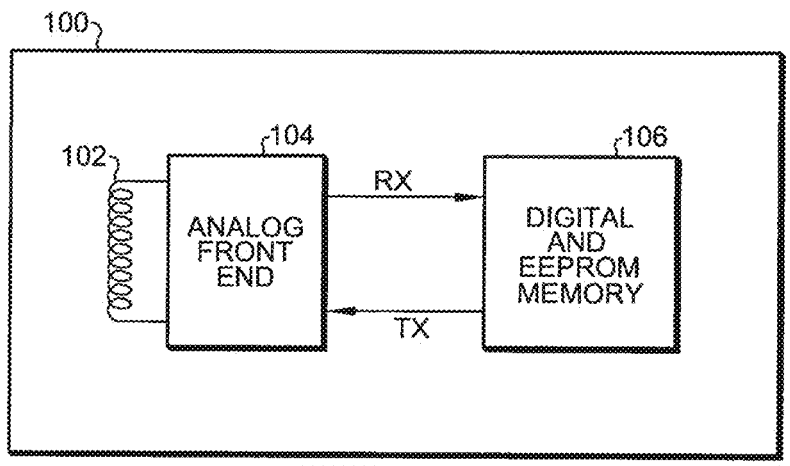
FIG. 1 is a block diagram of a prior art EEPROM based passive RFID tag.
Figure 2:
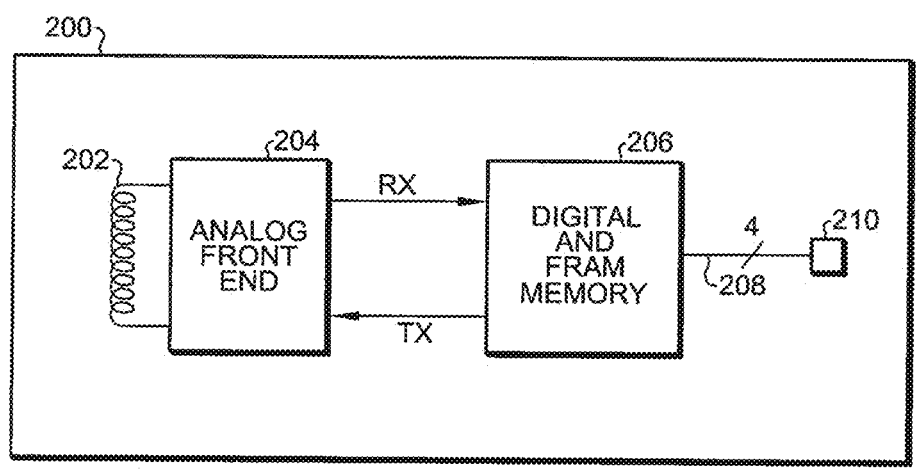
FIG. 2 is a block diagram of a FRAM memory based passive RFID tag according to the present invention.

Referring now to FIG. 2, a passive RFID tag 200 according to the invention includes an antenna 202, an analog front end 204, and a digital portion 206 that includes digital control circuitry and FRAM memory and communicates with the analog front end 204 using the RX and TX paths. Additionally, RFID tag 200 includes a serial interface bus 208 coupled to pins 210. A four bit wide bus 208 is shown in FIG. 2. The analog and digital portions of the RFID circuit 204 and 206 are normally integrated on to one or more integrated circuits. In the common/usual passive tag implementation shown in FIG. 2, the serial interface is normally not present and pins 210 are not used.

Figure 3:
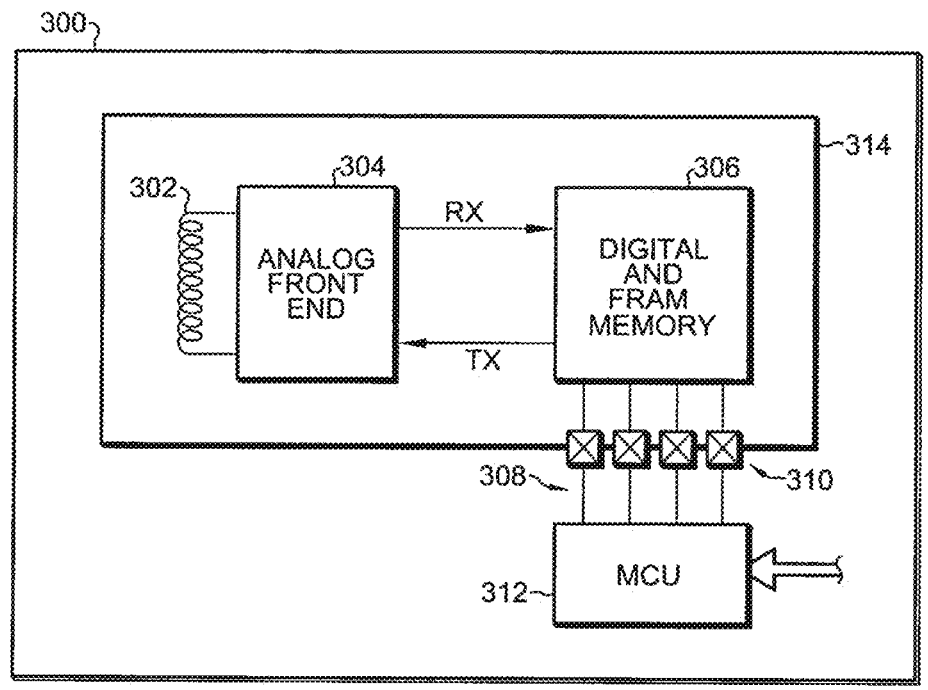
FIG. 3 is a block diagram of an embedded FRAM memory based RFID application.

Referring now to FIG. 3, an embedded RFID application 300 according to the present includes an RFID integrated circuit 314, which contains the analog front end 304 and the digital and FRAM memory portion 306. The antenna 302 may or may not be actually included in the RFID integrated circuit 314. Note in FIG. 3 that four pins 310 associated with the serial interface of the digital portion 306 are brought out. The four pins 310 are the chip select, clock, DATA 1, and DATA 2 pins, which are explained in further detail below.

The serial interface is typically coupled to a microprocessor 312, which is in communication with various control inputs associated with the RFID application 300. A typical application 300 could be a metering application, or a control application for a factory. The RFID integrated circuit 314 in a typical embedded application would be interrogated from time to time with a handheld reader (not shown in FIG. 3).

Figure 4:
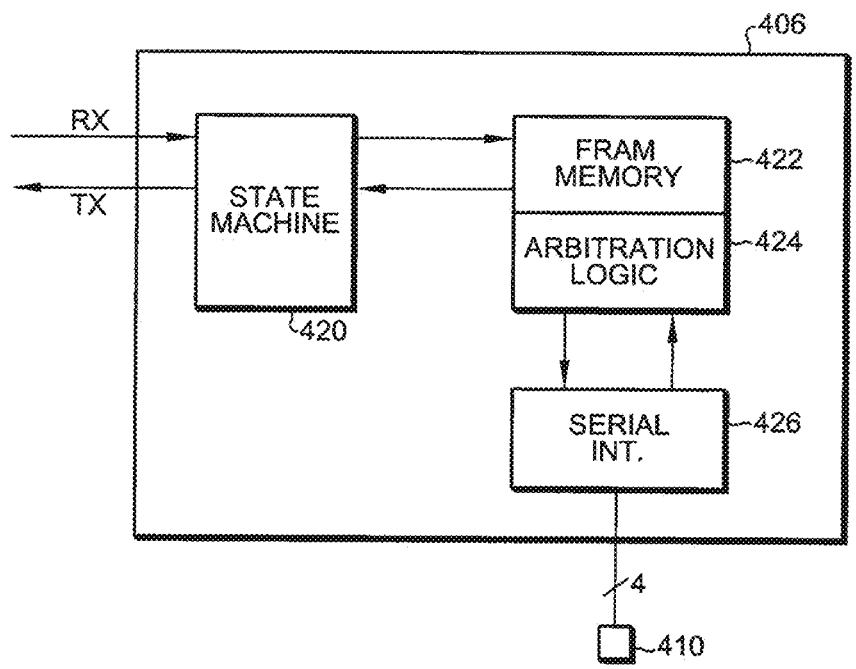
FIG. 4 is a further detailed block diagram of the digital portion of the FRAM based RFID circuit shown in FIGS. 2 and 3.

Referring now to FIG. 4, the digital portion of the circuits of FIGS. 2 and 3 is shown in greater detail. Digital portion 406 includes the RX and TX paths for reference with FIGS. 2 and 3. The RX and TX paths are in communication with a state machine 420 that is in bidirectional communication with FRAM memory block 422. An arbitration logic block 424 is associated with FRAM memory 422, and is used to bi-directionally control serial interface 426. In turn, serial interface 426 is coupled through a four bit bus to external pins 410.

Figure 5:
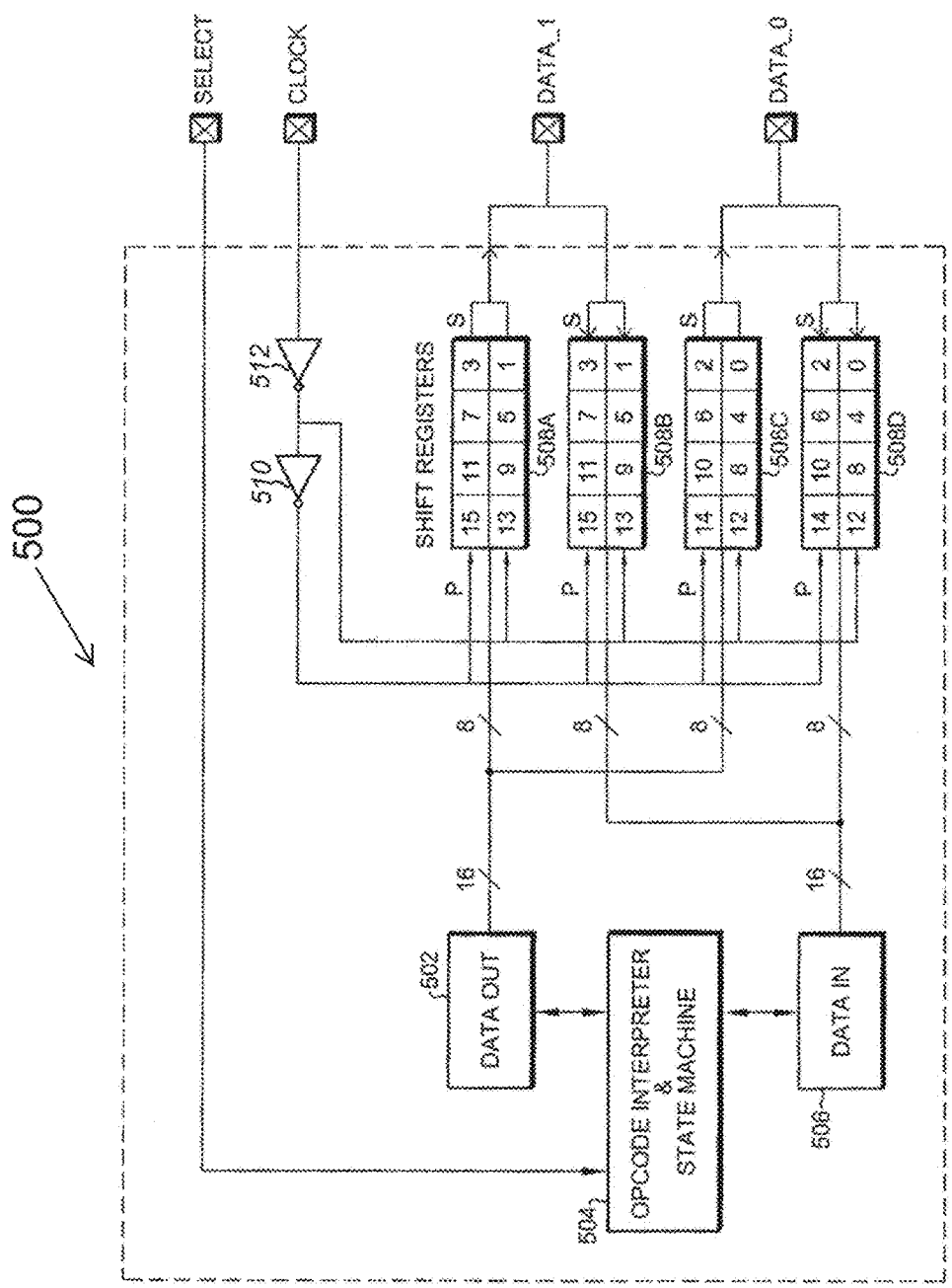
FIG. 5 is a further detailed block diagram of the serial interface of the FRAM based RFID circuit shown in FIGS. 2 and 3.

Referring now to FIG. 5, further details of the serial interface 426 of FIG. 4 are shown. As known in the art, a conventional serial peripheral interface (SPI) interface bus or a dual serial peripheral interface (DSPI) includes four pins: Select, Clock, DataIn, and DataOut. To transfer one byte of data, either in or out, requires eight clock cycles, in addition to the data dependent transitions on the single data line. The serial interface 500 shown in FIG. 5 appears to be similar to a SPI interface, but there are two important improvements. First, both data ports are used as a bidirectional pair. Second, both edges of the clock are used to shift or transfer data. With both of these improvements, only a pair of clock cycles is used to transfer a byte of data. The power used in data transitions is constant, but the power used for clock transitions is cut by a factor of four. Optionally, a single edge of the clock can be used, rather than both edges. Although this requires more power than the dual edge solution according to the present invention, the single edge solution still saves power when compared to the traditional SPI interface. Thus, the serial interface 500 shown in FIG. 5 is but one of the features for improving throughput in a FRAM memory based passive RFID tag or circuit, although it has utility in non-RFID applications as well. Specifically, serial interface 500 minimizes the number of clock transitions required to transmit a data word when compared to the convention SPI interface, while retaining the same pin count.

In FIG. 5, serial interface 500 includes a Select pin, a Clock pin, a bidirectional Data_1 pin, and a bidirectional Data_0 pin. The Select pin is coupled to an OpCode Interpreter and State Machine 504, which is realized in conventional logic circuits. State machine 504 is in bidirectional communication with Data Out register 502 and Data In register 506. Data Out register 502 is coupled through a 16 bit bus, which branches to two 8 bit busses, to shift register 508A and shift register 508C. Similarly, Data In register is coupled through a 16 bit bus, which branches to two 8 bit buses, to shift register 508B and shift register 508D. Shift register 508A loads data onto the Data_1 pin, shift register 508B receives data from the Data_1 pin, shift register 508C loads data onto the Data_0 pin, and shift register 508D receives data from the Data_0 pin. Shift registers 508A through 508D are operated by alternative clock cycles through inverters 510 and 512. The clocking and transfer scheme of the serial interface 500 is further explained with respect to the timing diagrams of FIGS. 6-10. Based on the received command, the state machine 504 produces the read or write control signal. It also transfers the address and data from the shift registers and applies them to the FRAM as appropriate.

Referring now to FIG. 6, the write cycle for 16 bits of information is shown. The CS Chip Select signal goes high, and, after a predetermined delay time of $t_{CSU}$, the write cycle begins. During the first four clock cycles of the CLK pin, the D1 data word includes a R/W bit, opcode information, and five address bits. An opcode can include information regarding an operational mode such as "test", "normal", "status", or "control". During the second four clock cycles of the CLK pin, the D1 data word includes eight data bits which will be written to the FRAM memory. Similarly, during the first four cycles of the CLK pin, the D0 data word includes opcode information and five address bits. During the second four clock cycles of the CLK pin, the D0 data word includes eight data bits, also written to the FRAM memory.

Referring now to FIG. 7, the read cycle for 16 bits of information is shown. The CS Chip Select signal goes high, and, after a predetermined delay time of $t_{CSU}$, the read cycle begins. During the first four clock cycles of the CLK pin, the D1 data word also includes a R/W bit, opcode information, and five address bits. During the second four clock cycles of the CLK pin, the D1 data word includes eight data bits from the FRAM memory. Similarly, during the first four cycles of the CLK pin, the D0 data word also includes opcode information and five address bits. During the second four clock cycles of the CLK pin, the D0 data word includes eight data bits, also from the FRAM memory.

Figure 8:
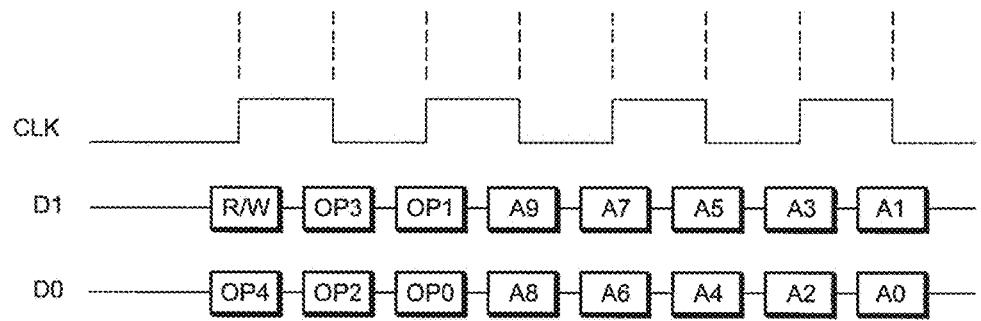

Referring now to FIG. 8 a detailed view of the first four clock cycles is shown. The first high transition of the CLK signal is used to transfer the R/W bit on D1 and to transfer the OP4 bit on D0. The first low transition of the CLK signal is used transfer the OP3 bit on D1 and to transfer the OP2 bit on D0. The second high transition of the CLK signal is used to transfer the OP1 bit on D1 and to transfer the OP0 bit on D0. The second low transition of the CLK signal is used transfer the A9 bit on D1 and to transfer the A8 bit on D0. The third high transition of the CLK signal is used to transfer the A7 bit on D1 and to transfer the A6 bit on D0. The third low transition of the CLK signal is used transfer the A5 bit on D1 and to transfer the A4 bit on D0. The fourth high transition of the CLK signal is used to transfer the A3 bit on D1 and to transfer the A2 bit on D0. The fourth low transition of the CLK signal is used transfer the A1 bit on D1 and to transfer the A0 bit on D0.

Figure 9:
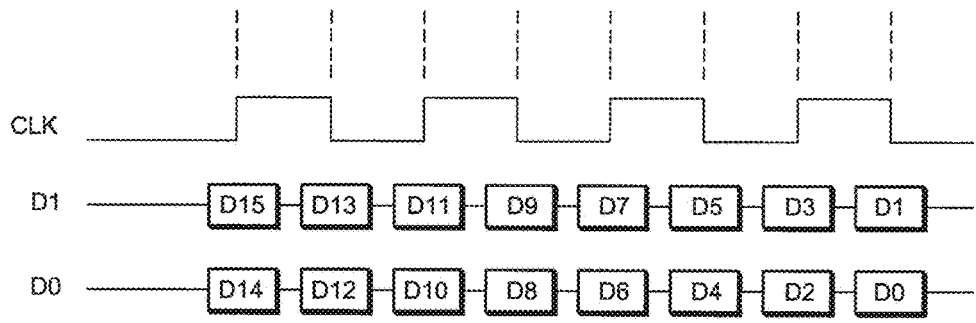

Referring now to FIG. 9 a detailed view of the write data is shown. The first high transition of the CLK signal is used to transfer the D15 bit on D1 and to transfer the D14 bit on D0. The first low transition of the CLK signal is used transfer the D13 bit on D1 and to transfer the D12 bit on D0. The second high transition of the CLK signal is used to transfer the D11 bit on D1 and to transfer the D10 bit on D0. The second low transition of the CLK signal is used transfer the D9 bit on D1 and to transfer the D8 bit on D0. The third high transition of the CLK signal is used to transfer the D7 bit on D1 and to transfer the D6 bit on D0. The third low transition of the CLK signal is used transfer the D5 bit on D1 and to transfer the D4 bit on D0. The fourth high transition of the CLK signal is used to transfer the D3 bit on D1 and to transfer the D2 bit on D0. The fourth low transition of the CLK signal is used transfer the D1 bit on D1 and to transfer the D0 bit on D0.

Figure 10:
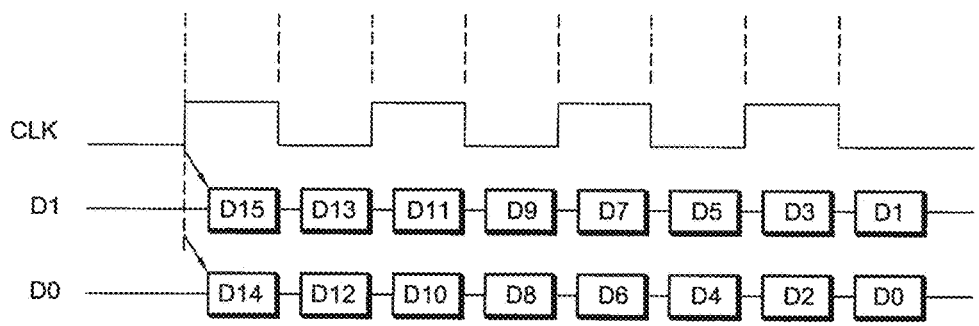

Referring now to FIG. 10 a detailed view of the read data is shown. The first high transition of the CLK signal is used to drive the D15 bit on D1 and to transfer the D14 bit on D0. The first low transition of the CLK signal is used transfer the D13 bit on D1 and to transfer the D12 bit on D0. The second high transition of the CLK signal is used to transfer the D11 bit on D1 and to transfer the D10 bit on D0. The second low transition of the CLK signal is used transfer the D9 bit on D1 and to transfer the D8 bit on D0. The third high transition of the CLK signal is used to transfer the D7 bit on D1 and to transfer the D6 bit on D0. The third low transition of the CLK signal is used transfer the D5 bit on D1 and to transfer the D4 bit on D0. The fourth high transition of the CLK signal is used to transfer the D3 bit on D1 and to transfer the D2 bit on D0. The fourth low transition of the CLK signal is used transfer the D1 bit on D1 and to transfer the D0 bit on D0.

One possible use of increased user memory space on an RFID device is to store a pedigree or other sequential set of tracking information. One way to store this information in the prior art might be to read the device memory until a vacant location is found. This is clearly inefficient. Memory storage could be better managed if the RFID system had a known location to use as an address pointer. Then, the RFID system could read the known location to determine the next available memory location. Still, this requires multiple memory accesses and multiple RFID command/response rounds. This slows throughput on, for example, an assembly line.

Figure 13:
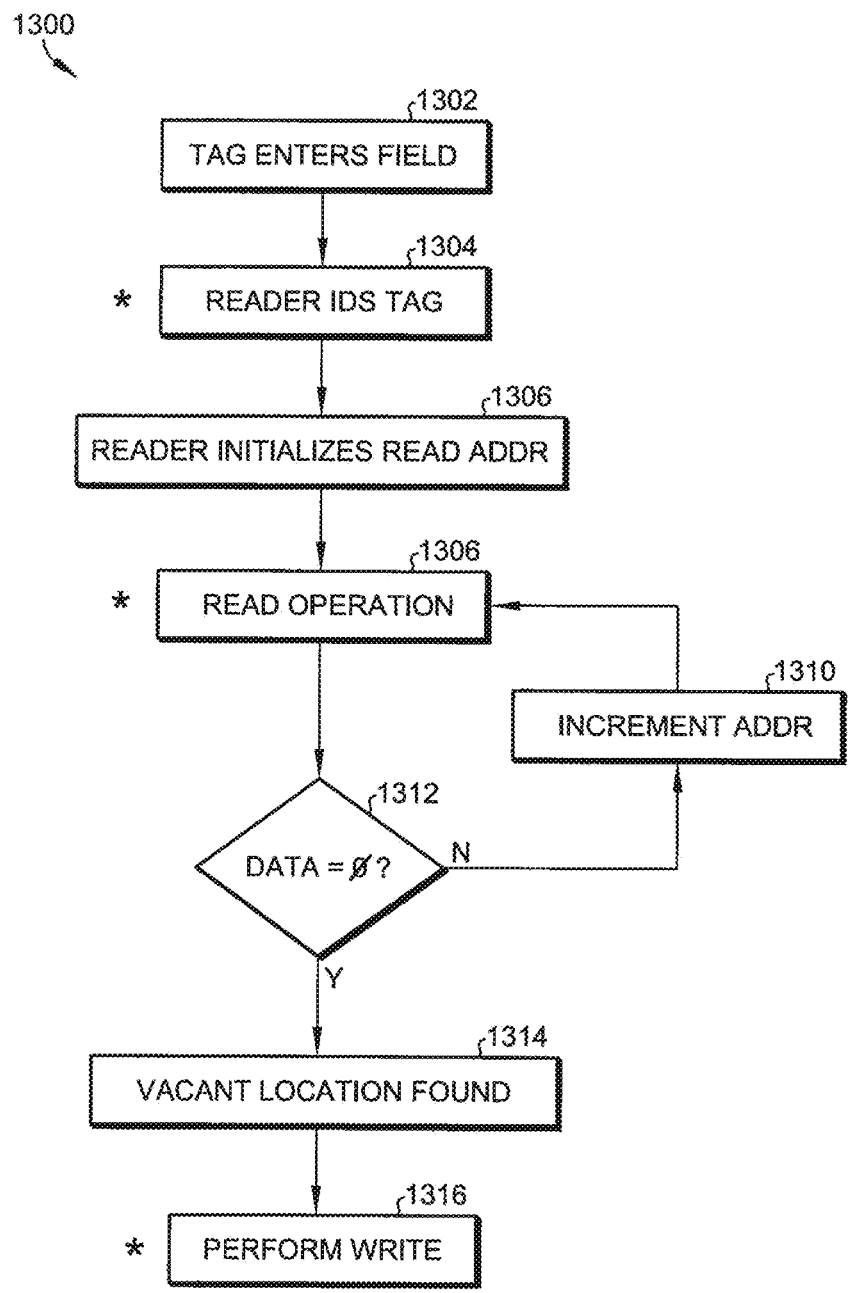
FIG. 13 is a flow chart of a prior art technique for writing data to memory.

A first memory storage technique 1300 according to the prior art is shown in the flow chart of FIG. 13, wherein the RFID tag has no present location indicator. Each occurrence of a wireless/RFID operation is denoted by an asterisk. At step 1302, an RFID tag enters a field produced by, for example, a reader. At step 1304, the reader identifies the RFID tag. At step 1306, the reader initiates the read address. At step 1308 the read operation commences. At step 1312, the data contents are read. If there is already data at that location, the address is incremented at step 1310, and the data contents are again read. This process is repeated until a zero data location is found. Once a zero data location is found at step 1314, the new data is written to memory at step 1316. It can be seen from the flow chart of FIG. 13 that there are a number of (depending on the number of times through the loop) separate steps in which a wireless/RFID operation is performed.

Figure 14:
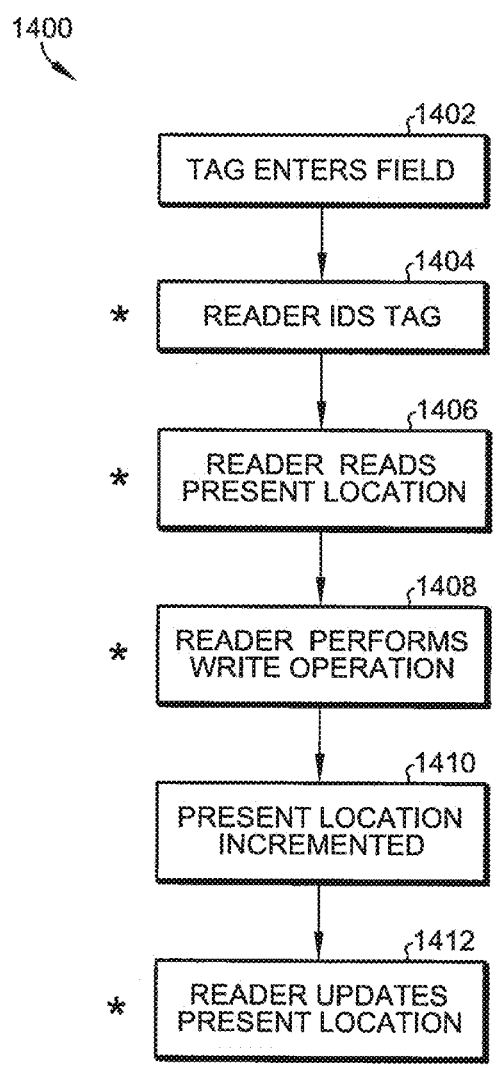
FIG. 14 is a flow chart of another prior art technique for writing data to memory.

A second memory storage technique 1400 according to the prior art is shown in the flow chart of FIG. 14, wherein the RFID tag has a present location indicator at a defined location. Again, each occurrence of a wireless/RFID operation is denoted by an asterisk. At step 1402, an RFID tag enters a field produced by, for example, a reader. At step 1404, the reader identifies the RFID tag. At step 1406, the reader reads the present location. At step 1408 the reader performs a write operation. At step 1410, the present location indicator is incremented. Finally, at step 1412 the reader updates the present location. It can be seen from the flow chart of FIG. 14 that there are four separate steps in which a wireless/RFID operation is performed.

According to the present invention, a memory pointer is located at a fixed read/writeable memory location. The user determines the range of his pedigree buffer and initializes the memory pointer to the lowest value in that range. A second memory location serves as the trigger address for the indirect write. When a user wants to write to the next location in the pedigree buffer, that write data is directed to the trigger address instead, and the controller will automatically write to the location pointed to by the memory pointer. When that write is complete, the controller increments the memory pointer to the next available location. Also, the controller will manage the behavior of subsequent memory accesses by interpreting the two associated control bits. These can operationally allow the pedigree buffer to automatically wrap back to the beginning for a case where much data is expected, but only the most recent records are necessary, or can be used to lock the data in locations below the pointer so that they cannot be overwritten by another operation, including a direct write to the memory.

Figure 12:
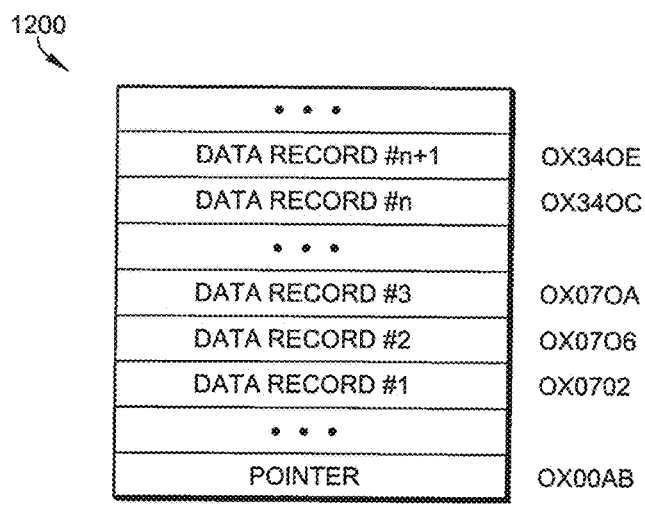
FIG. 12 is a portion of the memory contents associated with the memory pointer circuit of FIG. 11.

A portion of a memory 1200 using the pointer according to the present invention is shown in FIG. 12. In the example of the memory shown in FIG. 12, the pointer is located at address 0xAB, and the data records are built up through the remainder of the memory. At the time the first record is written, the value in the pointer location will be updated to 0x0706, to point to the first unused location after the previous record. When that location is subsequently written, the value of the pointer will change to 0x070A. This process continues for the remainder of the memory.

Figure 11:
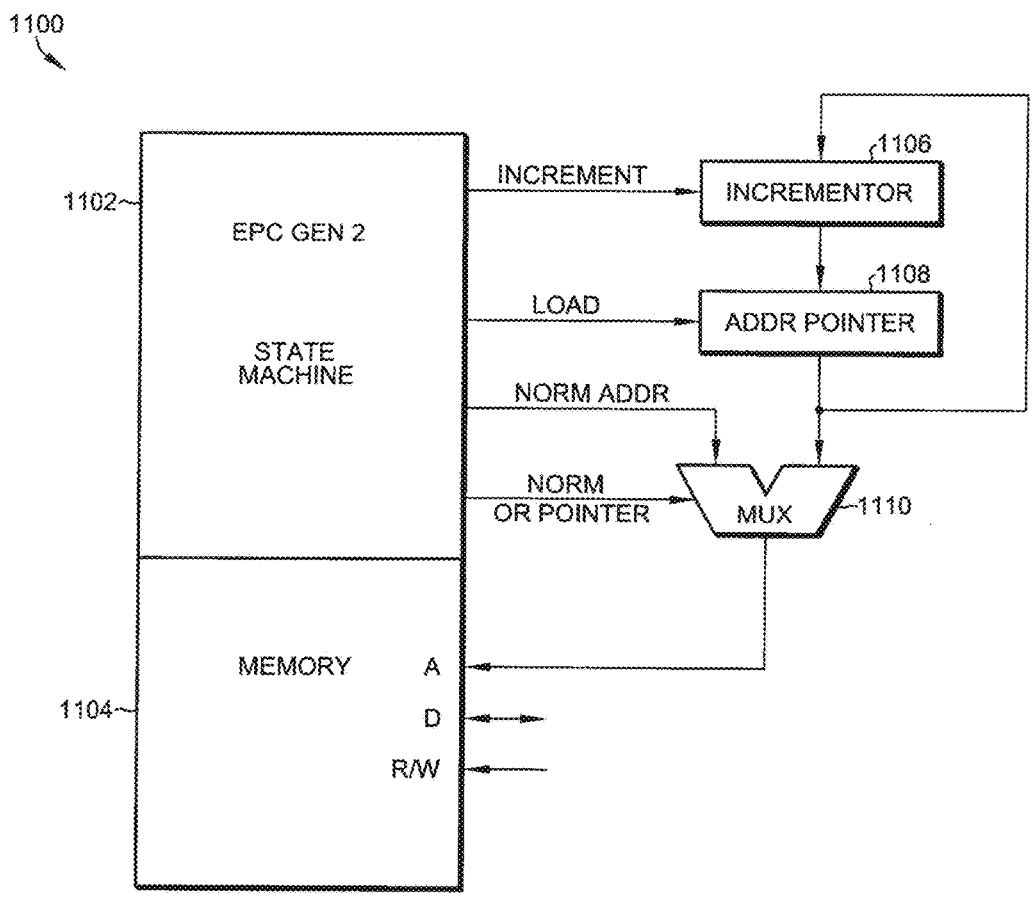
FIG. 11 is a block diagram of a memory pointer circuit associated with the digital portion of the FRAM based RFID circuit shown in FIGS. 2 and 3.

While the following description of the present invention is in reference to the Gen 2 EPC (Generation 2 Electronic Product Code) protocol, it is apparent to those skilled in the art that the present invention may be easily extended to include other RFID protocols as well. A block diagram 1100 of a state machine, memory, and associated circuitry for carrying out the pointer method of the present invention is shown in FIG. 11. The memory pointer circuit includes a Gen 2 EPC state machine 1102 for providing the Increment, LOAD, NormAddr, and Norm or Pointer control signals. State machine 1102 is a typical Gen 2 decoder, with the addition of controls for loading or incrementing the Address Pointer location, as well as selecting the stored or standard address value. Memory 1104 includes address, data, and R/W signals. An Incrementor 1106 has an input and an output, and receives the Increment signal. The Address Pointer register 1108 has an input and an output, and receives the LOAD signal. The output of register 1108 is coupled to the input of Incrementor 1106. A multiplexer 1110 receives the normal address at a first input, and the output of address pointer 1108 at a second input. The output of multiplexer 1110 is controlled by the normal or pointer control signal provided by state machine 1102. The output of multiplexer 1110 is coupled to the address input of memory 1104.

The state machine 1102 shown in FIG. 11 represents the entire EPC Gen2 protocol processor. The primary external input for this is the RX (received data) signal, which comes from the analog front end chip, as is shown in FIG. 2. The state machine 1102 processes the Gen2 commands; the block write command shown in FIG. 16 is an example of one of these commands. Depending on the nature of the specific command, the state machine 1102 may do a single or multiple memory read or write. In addition to the address control that is shown in FIG. 11, the state machine 1102 also provides the read/write control (R/W) and data (D).

Figure 15:
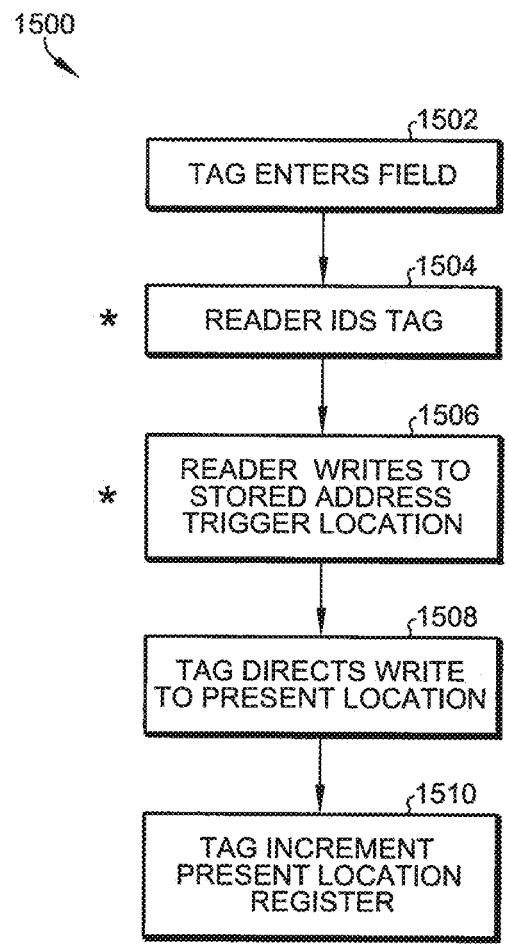
FIG. 15 is a flow chart of a technique according to the present invention for reading and writing data to memory using the memory pointer circuit of FIG. 11.

The method 1500 for operating the memory pointer circuit shown in FIG. 11 is shown in flow chart form in FIG. 15. Wireless/RFID operations are again denoted with an asterisk. According to the present invention, a tag enters the reader field at step 1502. At step 1504, the reader identifies the RFID tag. At step 1506 the reader writes to the stored address trigger location. At step 1508, the tag directs a write to the present location. At step 1510 the tag increments the present location register. Note that only two wireless/RFID operations are undertaken in the method 1500 of the present invention. Thus, interrogations of the RFID tag are minimized, and data throughput is desirably maximized.

The command structure 1600 of the EPC Global Block-Write command is shown in FIG. 16. The timing sequence of the command is indicated in the bit fields as shown in FIG. 16, from left to right. Included are the Command, MemBank, WordPtr, WordCount, Data, RN, and CRC (Cyclic Redundancy Check) bit fields. In an RFID application, a receiver must transfer all the bits and compute a CRC across the entire command, as well as providing a local buffer for the data. Until the entire command has been received and the locally computed CRC is compared to the external CRC (the last part of the command) the validity of the command, and particularly the address or data values, cannot be ascertained. If the two CRC values do not match, the entire command must be discarded.

For EEPROM or Flash memory technologies, Block-Writes are difficult given the slow write times of those technologies. They further require the use of an internal buffer to save all of the data prior to checking the message CRC.

Figure 17A:
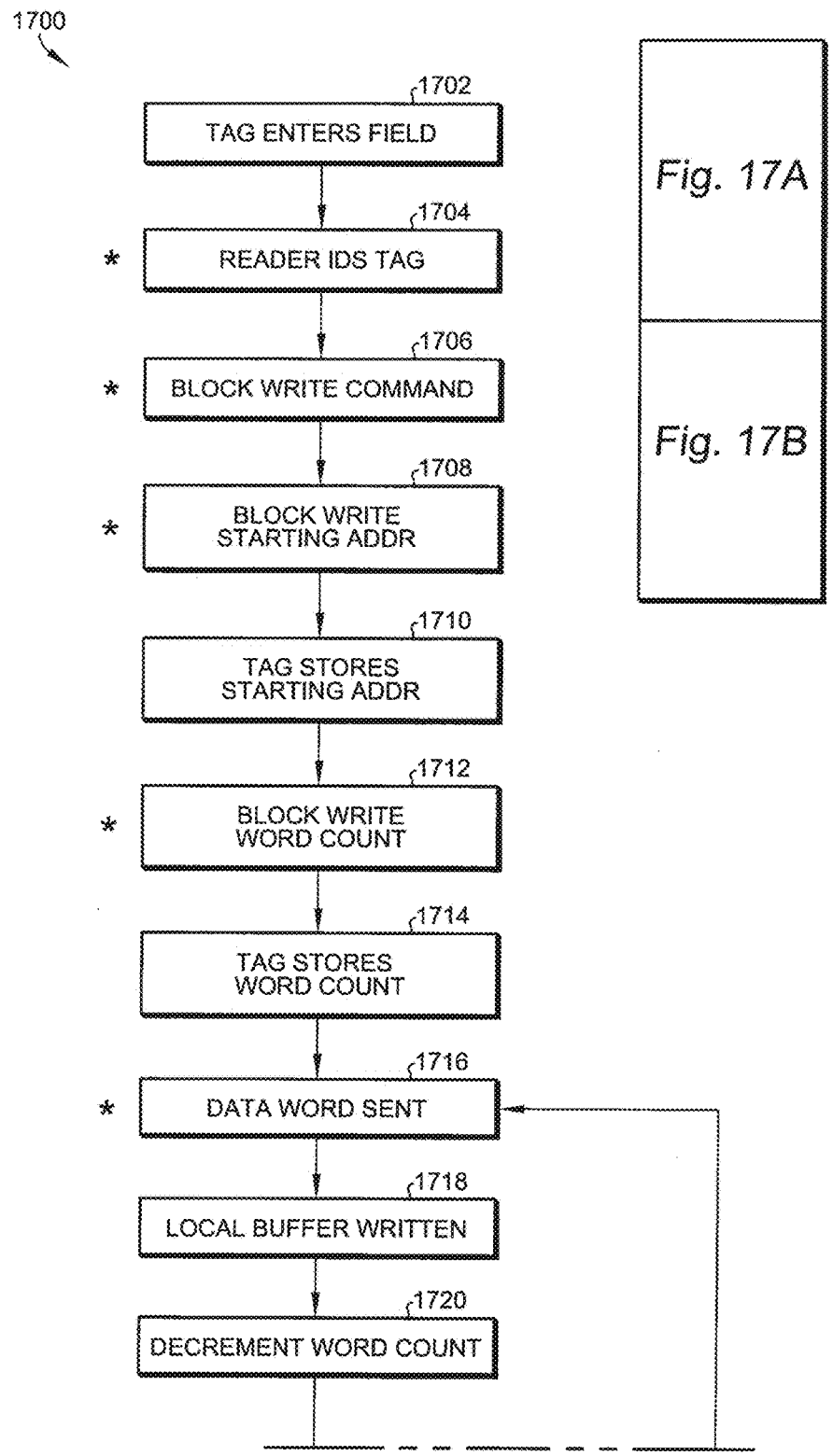
FIGS. 17A and 17B taken together represent a flow chart of a prior art method for implementing the BlockWrite command.
Figure 17B:
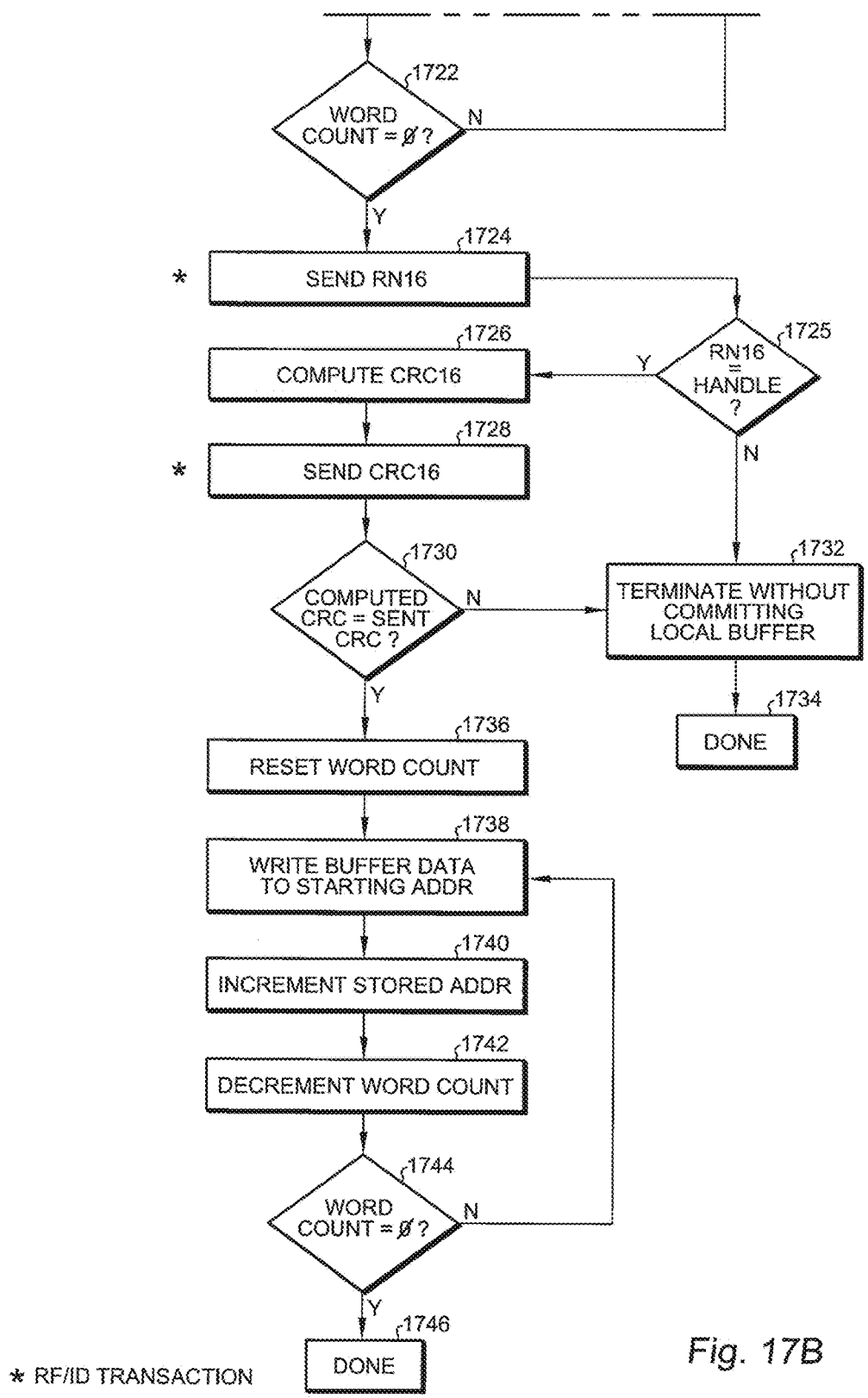

A traditional BlockWrite method according to the prior art is shown in FIGS. 17A and 17B. Referring to FIG. 17A, at step 1702 an RFID tag enters the field. At step 1704 the reader identifies the RFID tag. At step 1706 the Command bits of the BlockWrite command are received from the reader. At step 1708 the BlockWrite Word Pointer is received from the reader. At step 1710 the RFID tag stores this as the starting address. At step 1712 the BlockWrite Word Count is received from the reader. At step 1714 the RFID tag stores the word count. At step 1716 each data word is received from the reader. At step 1718 this word is written to a local buffer. At step 1720 the word count is decremented. Referring now to FIG. 17B, at decision block 1722 the word count is interrogated to find a zero word count. If the word count is not zero, the method is performed again starting at step 1716. If the word count is zero, then the method continues to step 1724 and the RN16 handle is received from the reader. The received handle is compared at step 1725 to the stored handle. If they match, the method continues to step 1726. If they do not match, the method continues directly to step 1732 where it is terminated without committing the local buffer contents to main memory and the method is complete at block 1734. At step 1726 the internal CRC16 is computed. At step 1728 the expected CRC16 is sent. At decision block 1730, the computed CRC is compared to the sent CRC. If they are different, then the RFID interaction is terminated at step 1732 without committing the local buffer contents to main memory, and the method is done 1734. If the computed CRC is the same as the sent CRC, then the method continues at step 1736 and the word count is reset. At step 1738 a word of buffer data is written to the starting address. At step 1740 the stored address is incremented. At step 1742 the word count is decremented. At decision block 1744, the word count is checked to see if it is zero or not. If the word count is non-zero, then the method is repeated starting with step 1738. If the word count is zero, then the prior art method is done at step 1746.

The method of the present invention includes several improvements. First, by using a stored address pointer, the address is always known. Second, since the user can point the starting address at a known safe block, there is no need for an intermediate buffer as in the prior art. The data can be written to the safe area, and the CRC computed as is normally done. If it matches, the data is retained and the address pointer is updated. If it does not, the address pointer is kept and the write can be repeated. The main advantage of the invention, however, is that using it (in conjunction with FRAM or other high speed nonvolatile memory) enables writes to be performed "on-the-fly" and without excessive area penalty, even though the EPC global protocol for Block Writes does not adequately support arbitrarily long, verified writes.

Figure 18B:
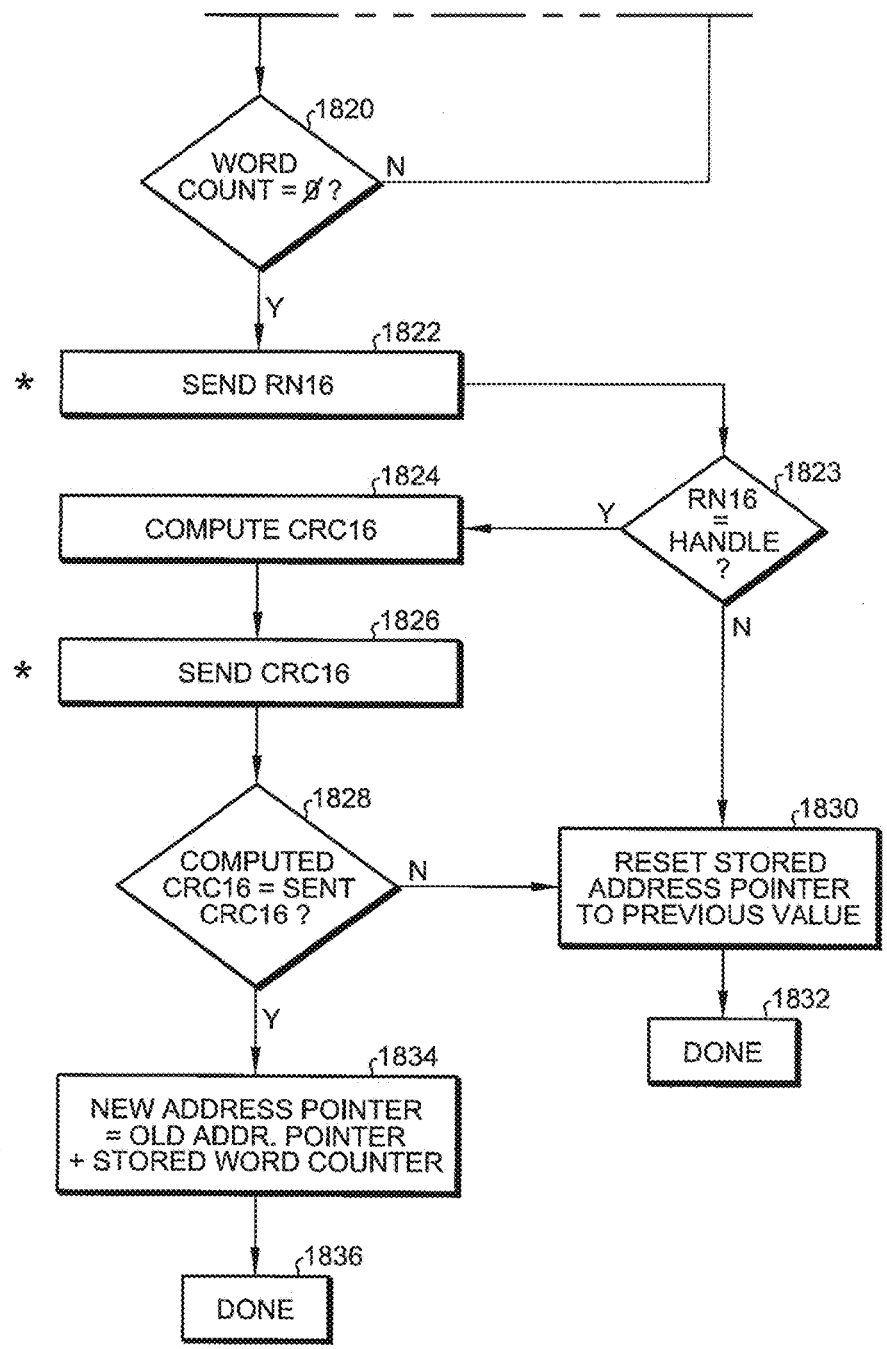

The BlockWrite method of the present invention is shown in a flow chart 1800 of FIGS. 18A and 18B. Referring now to FIG. 18A, the method of the present invention uses a stored address on the RFID chip to write to the next unoccupied memory space, which is a safe area and will not overwrite previously written memory contents. At step 1802 the RFID tag enters the field. At step 1804 the reader identifies the tag. At step 1806 the BlockWrite command is initiated. At step 1808, the stored address trigger location is received and recognized. At step 1810 the BlockWrite word count is received. At step 1812 the tag stores the word count. At step 1814 the first data word is sent. At step 1816 the primary buffer is written. At step 1818 the word count is decremented. Referring now to FIG. 18B, at step 1820 the word count is checked to see if it is zero or not. If the word count is not zero, then the method is repeated starting at step 1814. If the word count is zero, then the method is continued, and the RN16 handle is sent at step 1822. The received handle is compared at step 1823 to the stored handle. If they match, the method continues to step 1824. If they do not match, the method continues directly to step 1830 where it is terminated without committing the local buffer contents to main memory and the method is complete at block 1832. At step 1824 the internal CRC16 is computed. At step 1826 the expected CRC16 is sent. At decision block 1828 the computed CRC16 is compared to the sent CRC16. If the answer is no, the stored address pointer is reset to its previous value at step 1830, and the method is done at step 1832. If the answer is yes, then a new address pointer location is set to the old address pointer location plus the stored word count at step 1834, and the method is terminated at step 1836. The method according to the present invention assures that new information is always sent to a safe area, and that previously written memory contents are not overwritten.

RFID devices with secondary interfaces such as the embedded application shown in FIG. 3 usually have an associated controller such as MCU or CPU that may additionally require memory access. Such a solution requires significant power and thus limits the effectiveness and range of the RFID tag. In one embodiment, it may be more power efficient to control the secondary interface and peripheral devices without using an embedded or integrated controller.

The embodiments of the present invention allows for a simple, effective means of memory access control for an RFID circuit having two primary access ports as shown in FIG. 3, and explained in further detail with respect to FIGS. 19A-D.

According to one embodiment, an RFID interrogator/reader initiates an interrupt operation by writing data to two known addresses in the available memory space. The order is not important, but the data from the two writes must satisfy some predetermined relationships. In the first implementation, the two 16-bit words must XOR to a preset hexadecimal value such as 0x1234. Also, the data is only transferred for comparison at the first write to each location after a reset. A reset will also occur at the end of the interrupt process as well as at power-on.

In one embodiment, if the data does satisfy this condition, a rising edge interrupt signal is sent out via the serial port chip select and/or a GPIO port of RFID chip, such as but not limited to RFID IC 314 shown in FIG. 3. The serial port chip select pin is generally an input, but for this purpose it may be used as an output. The peripheral device such as an external controller will sense this rising edge (or high level) as an interrupt trigger. The proper response is to issue two full clock cycles on the serial port clock pin. This will acknowledge the interrupt and cause the RFID device to release the full serial secondary interface port for subsequent access. At the same time, it may disable the RF interface from being able to attempt a memory access.

When the external serial controller is finished with its transactions, it sends a specific op code or command which the RFID device recognizes as the end of the serial controller's access session. The serial bus is then reconfigured to an inert state such that the serial controller can no longer control it, and the RFID device resumes its normal activity. The interrupt controller will be reset to allow an additional interchange if desired.

Figure 19A:
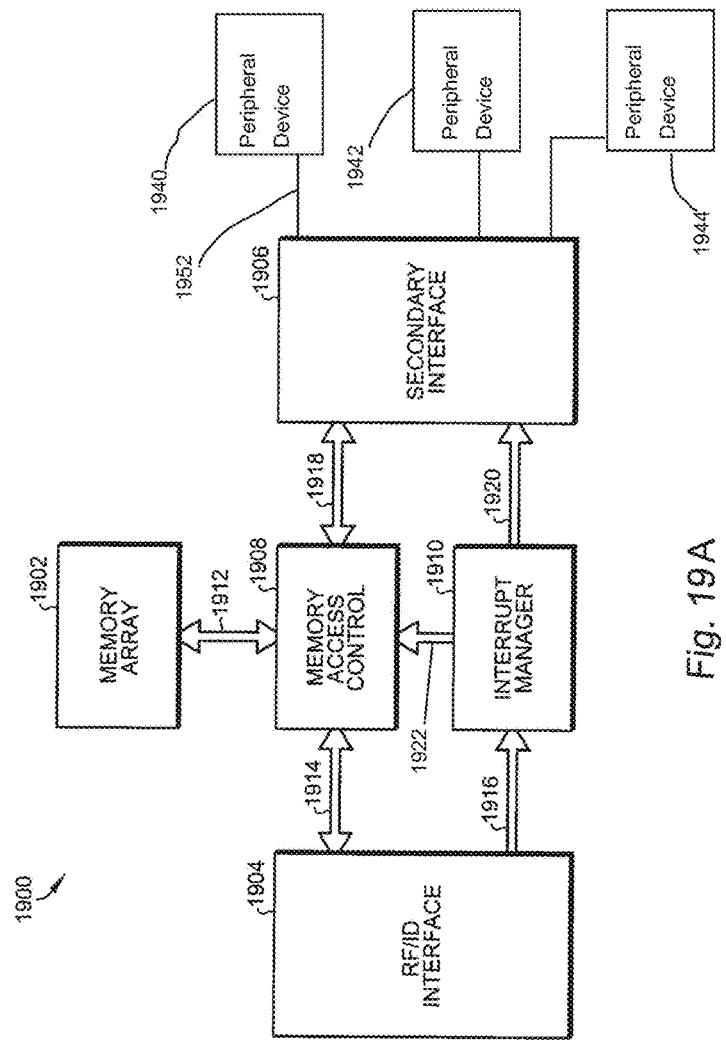
FIG. 19A is a block diagram representation of a portion of the digital circuitry associated with the circuits of FIGS. 2 and 3, according one embodiment of the present invention, including an interrupt manager block.

Referring to FIG. 19A that illustrates a portion of RFID circuit 1900, the memory access is controlled by interrupt manager 1910, which communicates with memory access control block 1908 via bus 1922. In turn, memory access control block 1908 communicates with memory array 1902 through bidirectional bus 1912. An RFID interface 1904 communicates with memory access control block 1908 via bidirectional bus 1914, and with interrupt manager 1910 through bus 1916. The serial secondary interface 1906 communicates with memory access control 1908 via bidirectional bus 1918, and with interrupt manager 1910 through bus 1920. The secondary interface 1906 is further coupled to one or more devices such as peripheral device(s) 1940, 1942 and 1944 via buses such as bus 1952. The quantity, configuration and types of peripheral devices may be specifically designed according to system requirements. In one embodiment, one or the other of RFID interface 1904 and secondary interface 1906 must be the interrupt master, and has initial and primary control and access of memory array 1902. Upon a proper command, that interrupt master interface can relinquish control and allow the other interface to take over intermittently. In one embodiment, secondary interface 1906 may include logic to determine which one of the peripheral device 1940, 1942 or 1944 to have memory access when it is taking over control of the memory. In one embodiment, peripheral devices 1940, etc. may or may not share bus(es) when coupling with secondary interface 1906. When secondary interface 1906 is finished, it signals to interrupt manager 1910 to relinquish the memory buses, and allows the primary interface i.e. RFID interface 1904 to regain control once again.

Figure 20A:
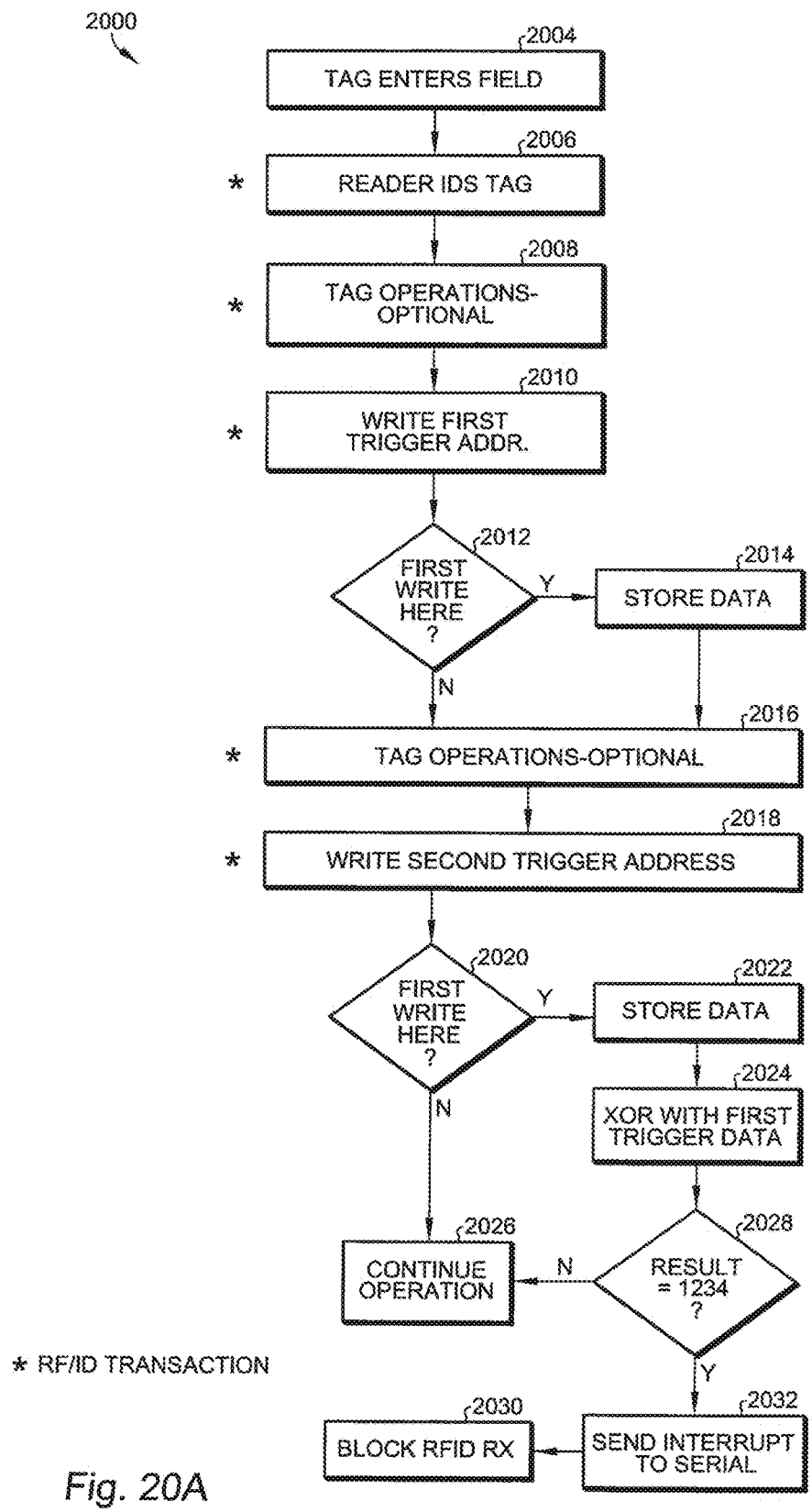
FIGS. 20A and 20B taken together represent a flow chart for performing an interrupt method according to an embodiment of the invention, associated with the interrupt manager block of FIG. 19A.
Figure 20B:
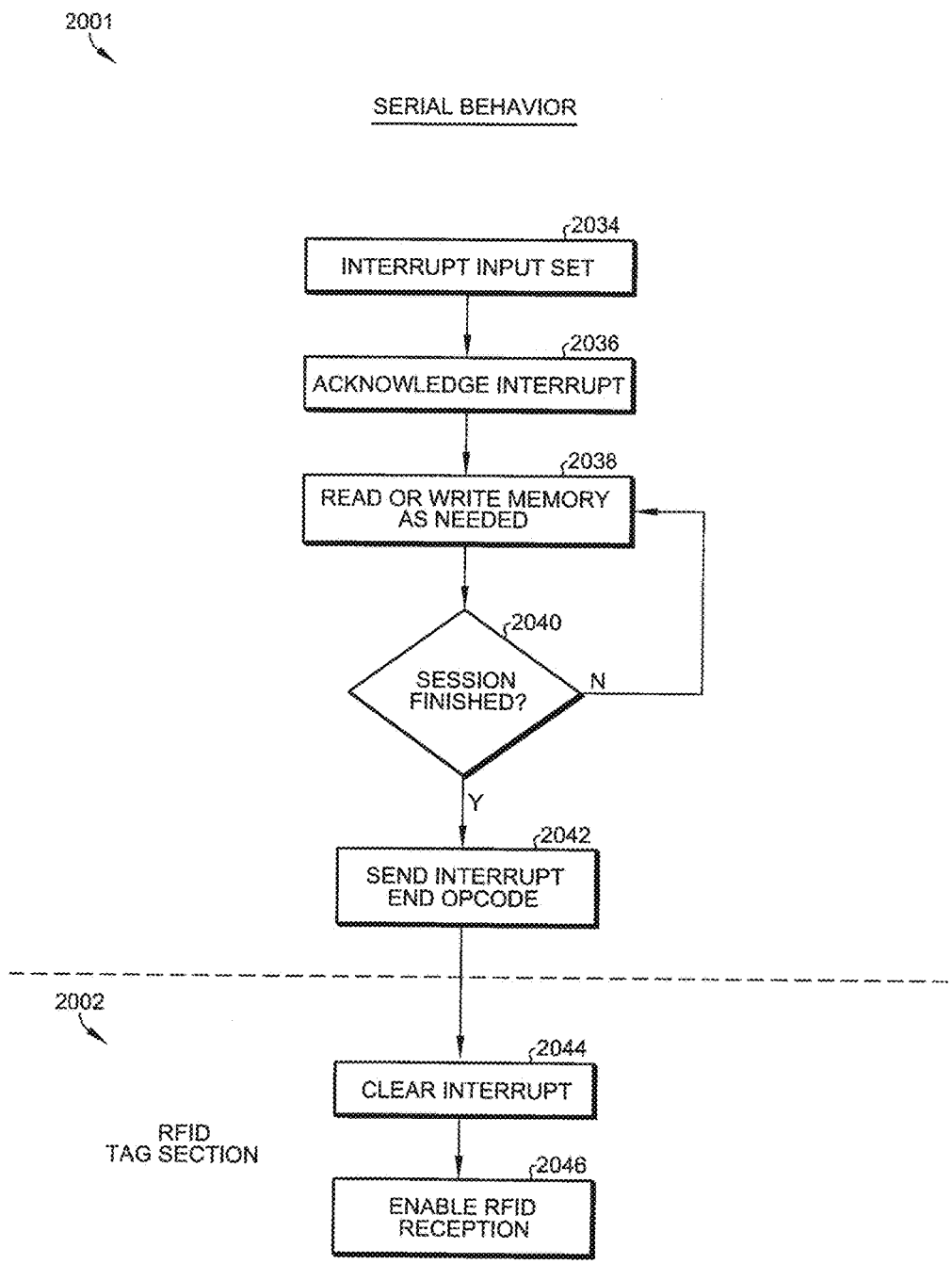

Referring to FIGS. 20A and 20B, one embodiment of the interrupt method is shown in flow chart 2000. Referring to FIG. 20A, a tag or RFID chip enters the field of RFID reader at step 2004. At step 2006, RFID reader identifies the tag or RFID chip. At step 2008, optional tag operations are performed. At step 2020, a first trigger address is written with first trigger data. At decision block 2012, the question is asked if this is a first write at that location. If the answer is yes, the write data from the command is placed in a local register and the method continues at step 2016. If the answer is no, optional tag operations are performed at step 2016. At step 2018, a second trigger address is stored with a second trigger data. At decision block 2020, the question is asked if this is a first write at that location. If the answer is yes, the write data from the command is placed in a second local register and the method continues at step 2024. At step 2024, the data in the second register is exclusive ORed (XORed) with the first trigger data. At decision block 2028, the result of the XOR operation is compared to a predetermined hexadecimal value such as 0x1234. If the answer is no, then normal tag operations are continued at step 2026. If the answer at decision block 2020 is no, then operations are also continued at step 2026. If the answer at decision block 2028 is yes, then an interrupt signal is sent to the serial port chip select, and RFID reception is blocked at step 2030. In one embodiment, the interrupt signal is a high signal with a rising edge. In other embodiments, the first and second trigger data may be subjected to operations additional to/other than XOR operation at step 2024.

Referring to FIG. 20B, the serial behavior of the peripheral microcontroller in the embedded application is shown in flow chart 2001. At step 2034, the microcontroller is interrupted with the previously described rising edge on the chip select pin. At step 2036, the microcontroller acknowledges the interrupt. At step 2038, the memory in the RFID chip is read or written to as required. Decision block 2040 shows that these memory interactions may be a single or multiple operations before the session is finished. If the answer at block 2040 is no, then the memory is read from or written to as required. If the answer is yes, the method is continued at step 2042, wherein an Interrupt End OpCode is sent.

Flow chart 2002 again describes the operations pertaining to the RFID tag 1900 or integrated circuit. At step 2044, the interrupt is cleared, and at step 2046, RFID interface/reception is again enabled.

The memory access control system as best shown in FIG. 19A does not require a sophisticated means such as an embedded microprocessor or CPU for coordinating access to the memory between the two different interfaces, for example between RFID interface 1904 and serial secondary interface 1906. In one embodiment, instead, the RFID side (interface) is chosen to be the master, which initiates and controls all memory accesses. The secondary serial interface 1906 may be told when it can intermittently access the memory during an interrupt initiated through the RFID master interface 1904.

In one embodiment, the interrupt method as described can be used to power/wake up an external or peripheral device(s) such as a microprocessor, controller or CPU which communicates to RFID chip via a serial interface. An acknowledge sequence initiated by the external device is used to assure reception of the interrupt and may lock out the RFID interface while the serial secondary interface is in control of the memory. This embodiment prevents a case where the RFID interface alone sets the interrupt condition, but the serial secondary interface never responds, and the RFID interface is forever locked out. Instead, the lockout is under control of the serial secondary interface, and ensures that there cannot be a case where the two interfaces fight for access to the memory. When the serial interface is finished, an Interrupt End op-code is used to re-allow the RFID interface to have access to the memory as well as blocking further serial access by external device(s) until the next interrupt cycle.

In one embodiment, memory access control block 1908 is essentially a set of multiplexers. The RFID and serial interfaces both provide addresses, data and select controls. Normally and not during an interrupt session, the multiplexers steer the RFID controls to the memory array 1902. During an interrupt session, the multiplexers are uniformly switched to the serial controls and the RFID controls are blocked. In one embodiment, if memory array 1902 is in the middle of an access cycle, there is a feedback mechanism from memory array 1902 which does not allow this switch of memory control/access to occur before the access is complete. As discussed, memory array 1902 includes FRAM memory.

The other advantage of the embodiment is that it allows the RFID interface 1904 to communicate directly with the serial secondary interface 1906 at the time of its choosing in a closed loop. Since RFID interface 1904 controls the initiation of the interrupt, it can initiate the activity, such as memory access, of the serial secondary interface 1906. Without an interrupt, the serial secondary interface 1906 would interact with memory array 1902 on its own cadence, and the RFID interface 1904 would have to continually check the status.

As discussed earlier, a sequence of two standard EPC Class 1 Generation 2 or other standards write operations may be used to trigger a high-going interrupt signal optionally via a Select pin of the serial interface of a RFID chip, such as WM72016 by Cypress Semiconductor Corporation. As best shown in FIG. 3, the Select pin is part of the SPI or DSPI ports to which a serial peripheral device such as an external CPU, microprocessor will be attached. In response to this interrupt, CPU that supports I/O interrupts is expected to acknowledge the interrupt with two cycles of the DSPI Clock via the Clock pin. Then, the CPU can use the DSPI port to interact with the memory such as FRAM on the RFID chip. In one embodiment, the RFID interface is temporarily disabled so that the CPU has exclusive access to FRAM memory array. When the CPU is finished with its operations, it releases FRAM memory with a specific op-code, usually called INTEND. In one embodiment, when CPU has completed its appointed activities, the final process in the interrupt cycle is for the CPU to send a specific op-code such as INTEND through the DSPI port via DATA pins to release the interrupt and the lock on the FRAM memory array. The procedure also re-enables the RF interface and its access to FRAM memory array.

Figure 19B:
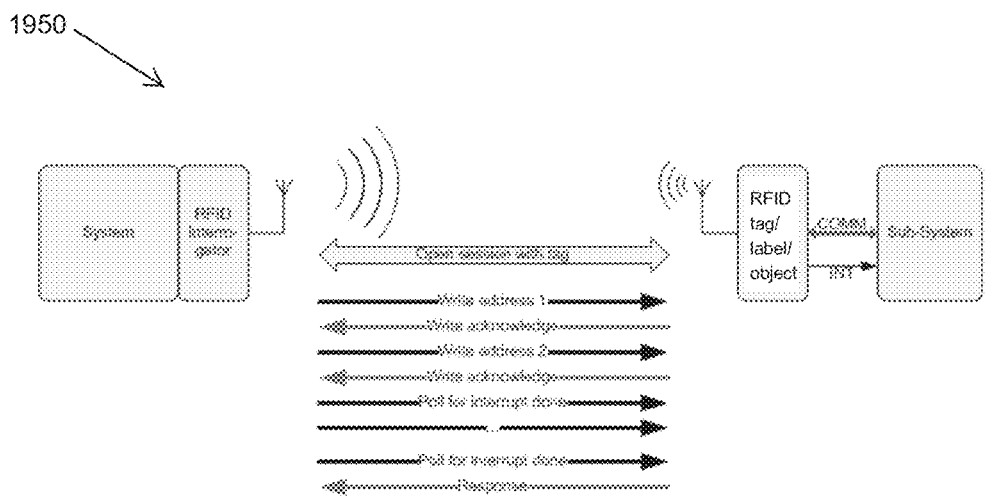
FIGS. 19B and 19C are block diagrams of two alternative method embodiments associated with interrupt initiation.

Referring to FIG. 19B, in one embodiment of RFID circuit 1950, after each write operation, a write acknowledge signal is transmitted via the RFID interface back to the RFID reader/interrogator. In one embodiment, the RFID reader/interrogator will poll the RF port via RFID interface of the RFID chip periodically to detect whether the interrupt cycle is complete. The lack of response from the RFID interface indicates to the RFID reader that RFID chip is busy with the interrupt operation session.

Figure 19C:
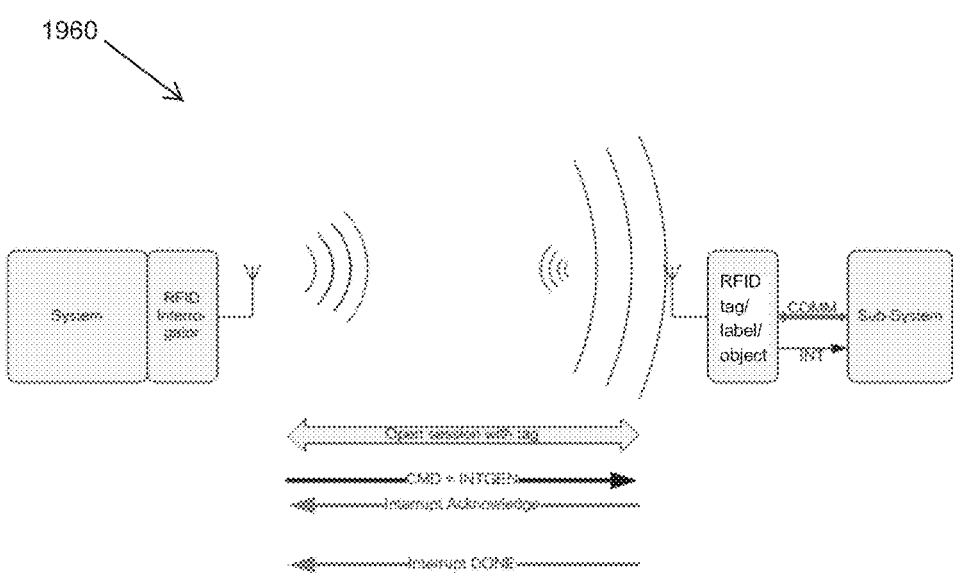

FIG. 19C is a block diagram showing a RFID circuit 1960 of an alternative method embodiment associated with interrupt initiation. In one embodiment, instead of using two write address commands, a single custom RFID interrupt command which utilizes a command structure similar to the EPC BlockWrite command as best shown in FIG. 16 and explained in its corresponding description. The custom RFID interrupt command is supported within the EPC Class 1 Gen2 UHF RFID standard specification and all previous versions thereof, and is used to initiate interrupt operation of RFID chip. In one embodiment, the custom command conforms to requirements as set forth in the standard, including the command code, CRC protection, and the way the custom command is used within the protocol. Therefore, this open flexibility provides a framework for manufacturers to implement features in their IP and still be compliant with the RFID standard. In one embodiment, the RFID chip would have a specific way to interrupt some back-end processor which includes the full RFID-compliant description of the interrupt allows RFID readers to use the custom command, usually through a software development kit (SDK) that is provided with the RFID reader hardware. Referring to FIG. 19C, RFID reader transmits a single custom command interrupt generation INTGEN to RFID chip via RFID interface. Upon receipt of the INTGEN command, RFID chip will start interrupt and enable secondary interface and peripheral device(s)/sub-system to gain access to FRAM memory in the RFID chip. Optionally, RFID reader may transmit an interrupt status INTSTAT command to RFID chip via RFID interface to check on the status of the interrupt. In one embodiment, instead of polling the RF port periodically via RFID interface of the RFID chip to detect whether the interrupt cycle is complete, an interrupt done INTDONE response is transmitted from the RFID chip. The inclusion of the INTDONE response would be exactly the same as is done when a reader performs a standards-compliant WRITE cycle to RFID chip as it responds with a "done" response to the RFID reader. In one embodiment, this implementation of interrupt generation aligns closer with the current further improving efficiency and potentially power reservation. By eliminating polling of the RF port to check on interrupt operation completion, the RFID embodiment 1960 shown in FIG. 19C can reduce communication time with RFID reader and provide better data points for system-level error handling. Besides, the INTGEN custom commands do not require writing data to known addresses in FRAM which will prevent accidental and false interrupt initiation. In one alternative embodiment, the data payload of the INTGEN instruction may be used to carry command or control information for either the RFID tag or the serial peripheral device. This may consist of requesting interrupt status, controlling GPIO, resetting the RFID tag interrupt status, or used to provide control/status of other state data. In another alternative embodiment, the data payload of the INTGEN instruction may be used to transmit full system-level instructions to a peripheral microprocessor connected to the serial port.

Referring to FIG. 19D, one embodiment of command structure 1970 of custom RFID interrupt command is shown. In one embodiment, the custom RFID interrupt command adopts a command structure similar to the EPC BlockWrite commands as described in of FIG. 16. The timing sequence of the command is indicated in the bit fields, from left to right. The custom RFID interrupt command includes the Command, Wordcount, Data, RN, and CRC (Cyclic Redundancy Check) bit fields. In an RFID application, a receiver must transfer all the bits and compute a CRC across the entire command, as well as providing a local buffer for the data. Until the entire command has been received and the locally computed CRC is compared to the external CRC (the last part of the command) the validity of the command, and particularly the address or data values, cannot be ascertained. If the two CRC values do not match, the entire command must be discarded.

In one embodiment, the high-going RFID interrupt signal can be used to trigger I/O activity in any system in addition to the memory access as described earlier. In one alternative embodiment, the RFID interrupt signal may be a low signal, depending on the system design. In an RFID system, RFID interrupt signal can be used to affect control of other systems or components. However, in some cases, some applications and/or peripheral devices may not be able to acknowledge the interrupt or subsequently issue the INTEND op-code to clear it. In one embodiment, in those circumstances, RFID chip can be restored to the original state/non-interrupt state i.e. RFID interface access to FRAM memory, by simply removing the RF source e.g. radio frequency field as provided by the RFID reader and allowing RFID chip to reset.

In one embodiment, the RFID interrupt as described in FIGS. 19A-D and 20A&B may be used to control more than one serial peripheral devices. Instead of sending RFID interrupt signal via a single I/O pin of one serial secondary interface, the same embodiment can be extensible to include more I/O pins and/or more serial interfaces during a similar process.

Figure 21:
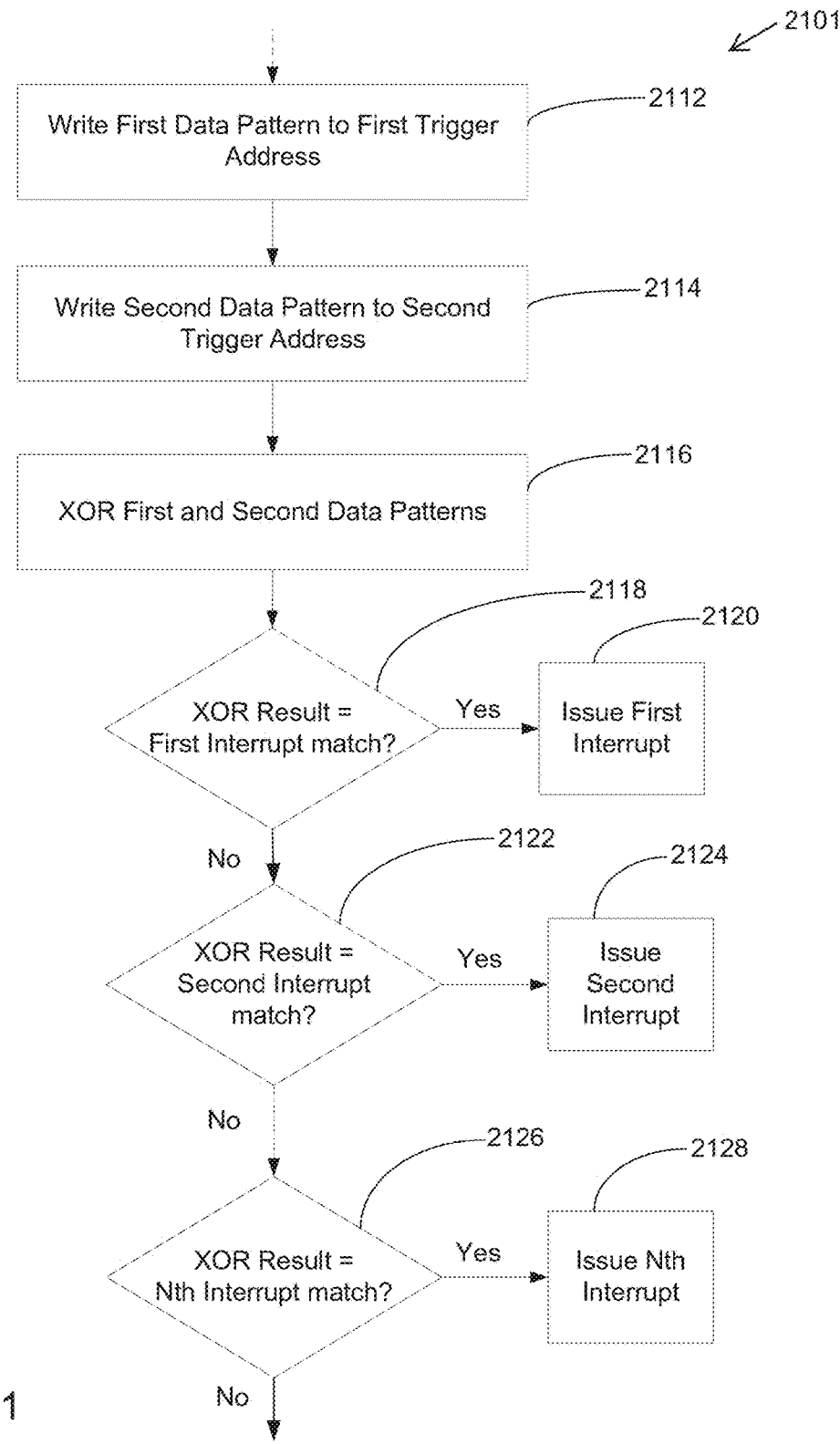
FIG. 21 is a flow chart for performing an interrupt method according to an embodiment of the invention, associated with the interrupt manager block of FIG. 19A.

FIG. 21 is a flow chart 2101 of steps for performing an interrupt method in which RFID interrupt signal is configured to be sent to potentially more than one serial peripheral devices. Referring to FIG. 21, after RFID reader has identified RFID chip/tag and is ready to initiate an interrupt, at step 2112 a first trigger data pattern is written to a first trigger address in FRAM memory. It will then be questioned whether this is a first write at that location. If the answer is yes, the write data from the command is placed in a local register and the method continues at step 2114. At step 2114, a second trigger data pattern is written to a second trigger address. Similarly, it will then be questioned whether this is a first write at that location. If the answer is yes, the write data from the command is placed in a second local register and the method continues to step 2116. At step 2118, the data in the second trigger data is exclusive ORed (XORed) with the first trigger data. At decision block 2118, the result of the XOR operation is compared to a first predetermined hexadecimal value such as 0x1234. If the answer at decision block 2118 is yes, then a first interrupt signal is sent to a first serial peripheral device via the chip select port at serial secondary interface. In one embodiment, steps 2112 to 2118 are similar to the process described earlier in FIG. 20A. If the answer at decision block 2118 is no, it will proceed to block 2122 in which the result of the XOR operation is compared to a second predetermined hexadecimal value which is different from the first value. If the answer at decision block 2122 is yes, then a second interrupt signal is sent to a second serial peripheral device via a different chip select port at serial secondary interface. In alternative embodiments, according to the system design and intended functions, the first and second peripheral devices and serial secondary interface may or may not be the same. If the answer at decision block 2122 is no, it may proceed to compare the result of the XOR operation to a third predetermined hexadecimal value. In one embodiment, the similar comparing step may be repeated to subsequent predetermined hexadecimal value(s), as illustrated in blocks 2126 and 2128, to determine which interrupt signal to be issued to which chip select pin and/or in which serial secondary interface. The interrupt initiation process will end when no match is found. As described, the mechanism for triggering the interrupt requires trigger data written to a pair of known trigger address locations. In one embodiment, using the same two addresses, with different data patterns used to convey port function for an expanded set of I/Os, additional pins could be controlled. In other embodiments, the first and second trigger data may be subjected to operations additional to/other than XOR operation at step 2116.

Alternatively or additionally, in one embodiment, the first and second trigger data can be written to different trigger address pairs in which each pair is corresponding to a different serial peripheral device. The result of the XOR operation is compared to one single predetermined hexadecimal value such as 0x1234. If the result of the XOR operation matches the predetermined hexadecimal value, the particular trigger address pair where the trigger data is written to will determine which serial peripheral device the interrupt signal is sent to. An example of trigger address pairs are listed in Table 1.

TABLE 1

| DSPI Address | Gen-2 Memory Bank | Gen-2 Address | Word Pointer (EBV8) | Description |
| --- | --- | --- | --- | --- |
| 0x018 | USER | 0x004 | 0x04 | First Interrupt Trigger Pair |
| 0x019 | USER | 0x005 | 0x05 | |
| 0x01A | USER | 0x006 | 0x06 | Second Interrupt Trigger Pair |
| 0x01B | USER | 0x007 | 0x07 | |
| 0x01C | USER | 0x008 | 0x08 | Third Interrupt Trigger Pair |
| 0x01D | USER | 0x009 | 0x09 | |

In yet another alternative embodiment, the INTGEN custom command which is shown in FIG. 19C and discussed in its corresponding description may be used to initiate the interrupt to multiple peripheral devices. In one embodiment, INTGEN custom command can convey an address or other means of selecting from multiple peripheral devices, via the Auxiliary Interrupt Data bits, as best shown in FIG. 19D.

In one embodiment, the interactions during an interrupt session between the peripheral device(s) and RFID chip are not limited in any way as they can be extended beyond Reads or Writes to the memory. The interactions are configurable through user application to determine what should take place. The configuration requires coordination at the system level, from RFID reader and its infrastructure through the CPU operating code. In one embodiment, a representative application is a metering application in which a peripheral CPU controls or has built in a flow sensor, or a temperature sensor or other sensors. RFID reader would initiate an interrupt and the CPU would be woken up by the interrupt signal, it will then acknowledge the interrupt and thus block RFID interface access to FRAM memory, check the FRAM memory for specific instructions, then arm and interrogate the sensor(s), store the result in the FRAM memory, and finally, issue INTEND command to relinquish access and control of the FRAM memory. After that, RFID reader will regain control and access to FRAM memory via RFID interface and be able to read the meter values stored by the peripheral CPU during the interrupt.

Figure 22:
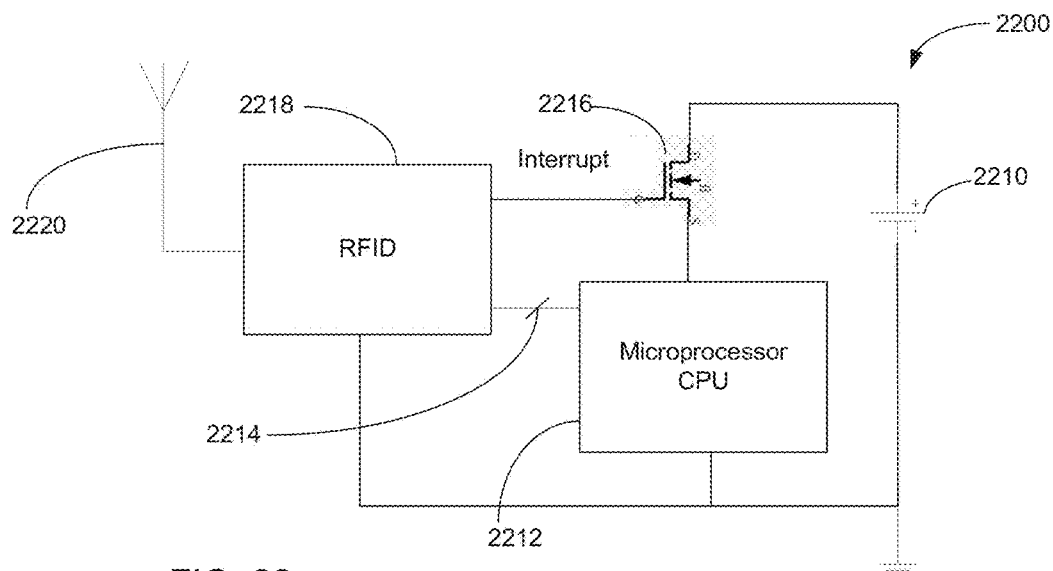
FIG. 22 is a block diagram of one embodiment of an embedded FRAM memory based RFID circuit.

As discussed, RFID interrupt is not limited to memory access control. In one embodiment, the RFID interrupt signal is used to control the state of a power switch, optionally providing power to a peripheral CPU or processor as illustrated in FIG. 22. Referring to FIG. 22, it shows a representative partial wireless circuit 2200 which includes antenna 2220, RFID chip 2218 such as WM72016 by Cypress Semiconductor Corporation, switch 2216, serial bus 2214, CPU 2212 and battery 2210. In one embodiment, CPU 2212 is powered by battery 2210. For extremely power sensitive applications, the standby or sleep current of even a modern CPU 2212 can represent too great of a load on battery 2210. As shown in FIG. 22, interrupt signal sent via GPIO port and/or CS select pin of a serial secondary interface is used to control power switch 2216 to ensure that battery 2210 does not continue to drain through CPU 2212 while the system 2200 is off and CPU 2212 is unpowered, or in a low power mode when there is no interrupt operation. This allows using a smaller, cheaper battery, or equivalently, a longer life for the application. In one embodiment, when a RFID interrupt is initiated, the high-going interrupt signal is sent to power switch 2216, such as an n-channel FET. The high-going interrupt signal is coupled to the gate in order to turn on power switch 2216 and wake up CPU 2212. CPU 2212 will then acknowledge the interrupt and proceed with its activities. In one embodiment, the Acknowledge and INTEND process may still be completely supported, as CPU 2212 still has access to the full DSPI port via bus 2314. Optionally, the acknowledge function can be coded in CPU 2212 boot routines which may allow CPUs that do not support I/O interrupts to be used in this manner in a wireless system as well as realizing greater power savings by having the CPU 2212 fully off between wireless activities.

Figure 23:
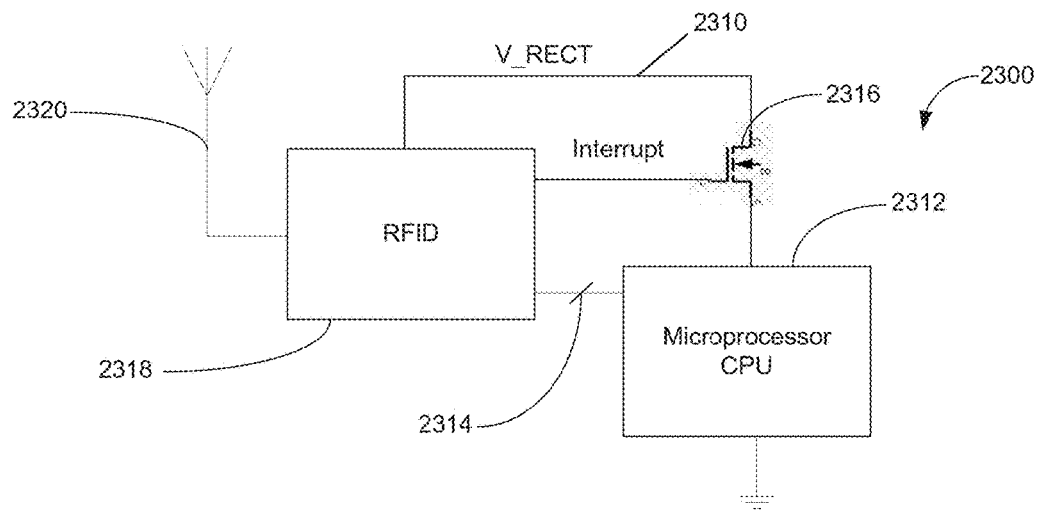
FIG. 23 is a block diagram of another embodiment of an embedded FRAM memory based RFID circuit.

FIG. 23 shows a representative partial wireless circuit 2300 similar to circuit 2200. Referring to FIG. 23, instead of using battery 2210 as power supply to CPU 2312, power is harvested by RFID chip 2318 optionally of RF signal received from RFID reader (not shown) and provided to CPU 2312 via coupling 2310. In one embodiment, the high-going interrupt signal is sent to the gate of power switch 2316 to turn it on. Power switch 2316 enables CPU 2312 to operate under excess power from the RFID harvester. Powering CPU 2312 as shown in circuit 2300 is a drain on the RF resources and will limit the operating range of the transceiver. Therefore, it is advantageous to not burden the harvester with the CPU power load when the CPU is not needed and put it in a low power mode, or fully off, with the control of RFID interrupt signals.

Figure 24:
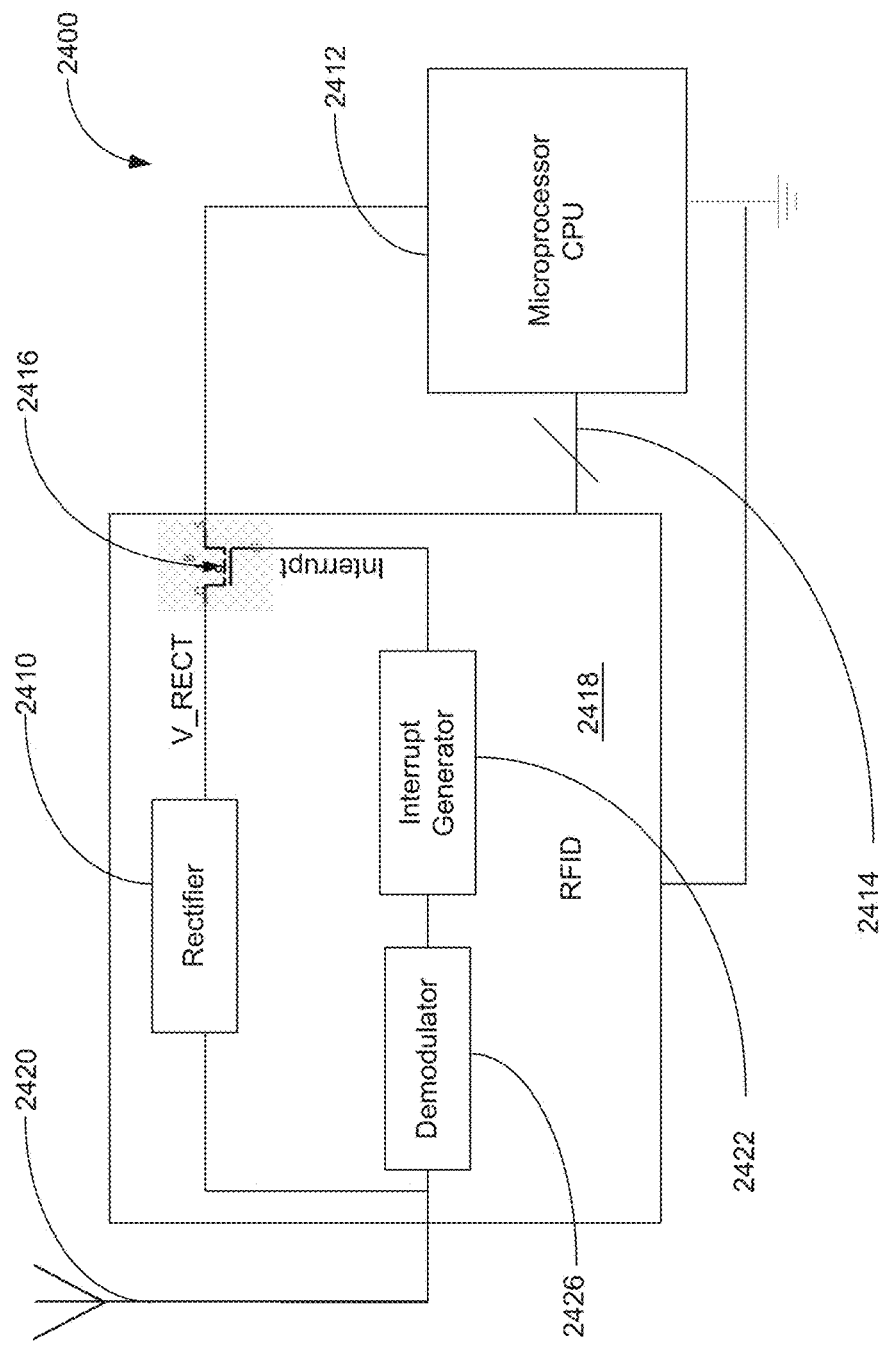
FIG. 24 is a block diagram of yet another embodiment of an embedded FRAM memory based RFID circuit.

FIG. 24 illustrates a representative partial wireless circuit 2400 in which power switch 2416 is integrated in RFID chip 2418. In one embodiment, since the available power is known due to the capacity of the internal rectifier/harvester 2410, a switched output power port with power switch 2416 can be sized to deliver any available excess power. Besides, using RFID interrupt signal may include far greater control over external resources than are found with no, or single pin interrupt methods in wireless applications. Embodiments illustrated in FIGS. 22-24 enable efficient, practical use of an external CPU with an emphasis on power optimization.

It is important to note that RFID interrupt signal can also be used in non-CPU environments in which the peripheral devices may not be CPU, MCU or processor of any type. In some embodiments, the peripheral devices may not even require access to the memory at all. In these circumstances, it may not be necessary to acknowledge the interrupt and switch access to the memory from RFID interface to serial secondary interface. The peripheral devices are controlled wirelessly by RFID interrupt signal via a GPIO function. A few exemplary embodiments are shown in FIGS. 25A-25D. Referring to FIG. 25A, the high-going RFID interrupt signal initiated by RFID interface is coupled to and provides power to LED 2510. Referring to FIG. 25B, the RFID interrupt signal is one of the inputs of a peripheral logic 2520. Referring to FIG. 25C, the RFID interrupt signal is used to induce a voltage signal in a peripheral circuit 2530. And referring to FIG. 25D, the RFID interrupt signal is used as a control signal of a peripheral circuit, such as a voltage regulator 2540. As discussed earlier, some peripheral devices may not have the capability to acknowledge and/or terminate the interrupt operation. In one embodiment, RFID chip is reset when it is not in the range of an RF source and/or RFID reader. In one alternative embodiment, the alternative interrupt method best shown in FIG. 19C may be used to reset the RFID chip without removing the RF source. The data payload "DATA" of the alternative interrupt generation control command shown in FIG. 19D may be used to carry control instructions, including an instruction to terminate the interrupt. This has the advantage of keeping a session open with the RFID tag, improving communication efficiency between the RFID reader and the RFID tag.

FIGS. 24 and 25A-D illustrate some embodiments of circuits where RFID interrupt may be potentially adapted as a more conventional GPIO control. In one embodiment, instead of utilizing a traditional transponder, the RFID chip 2418 such as WM72016 is installed on a printed circuit board (PCB) and may be used to store manufacturing data. This manufacturing data is written from a reader that is aligned with the manufacturing flow and may be used to store date of manufacture, operator information or other key data. In one embodiment, the RFID interrupt as GPIO control may be used to set indicators (LEDs or similar) as best shown in FIG. 25A, enable other indicators such as a buzzer, manufacturing option indicators such as logic signals or relay controls as illustrated in FIGS. 25B and 25D, or a regulator enable for temporary use of the harvested field during assembly as illustrated in FIG. 25C. In other embodiments, other uses for temporary, in-line control and configuration can be adopted with the capabilities presented by the RFID interrupt embodiments disclosed earlier. Embodiments where RFID chip is used on a PCB are not limited to a manufacturing environment. For instance, it can also be considered as a wireless analog to traditional optically isolated interfaces where the system grounds of the controller (reader/infrastructure) and the target system are not common. In other words, using wireless means such as RFID to trigger controls and indicators at a PCB level.

A wireless method with no additional power source to interact and control with a distant or disconnected system is presented herein. The embodiments may be for UHF (ca. 900 MHz) technology, but they can be easily adaptable to other protocols, published or private, and at other operating frequencies. In other embodiments, different operating frequencies may work better for different applications. For instance, 433 MHz, 900MHZ and 2400 MHz are all used for RF applications, but each frequency band has different properties and may be better suited for use around metals or liquids. When combined with a sufficiently secure protocol, the interrupt operation could be used to lock or unlock valuable assets.

Figure 26:
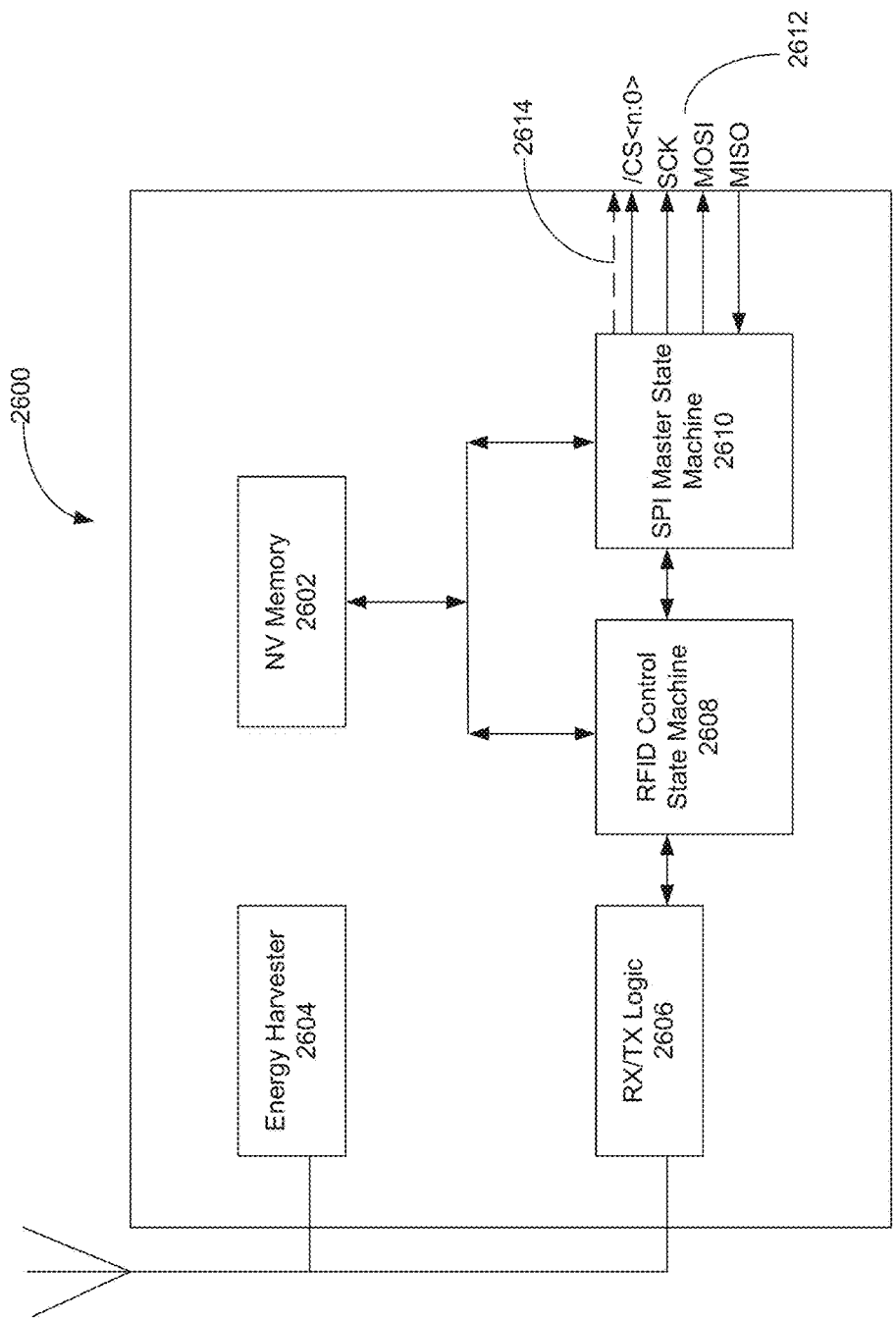
FIG. 26 is a block diagram of one embodiment of an embedded FRAM memory based RFID, including a SPI master/slave interface.

In an RFID application, ultra-low power operation is a key characteristic with an operational power budget measured in micro-watts. As such, supporting a general purpose microprocessor will be too much of a burden for the limited power resources. In one embodiment, a RFID device/tag 2600 as shown in FIG. 26 incorporates a master/slave serial interface which does not require an integrated or embedded microprocessor (MCU or CPU) to perform RFID readers' commands such as meter reading of sensors in additional to the interrupt operation discussed earlier. In one embodiment, the master slave serial interface can be applied to SPI, DSPI, inter-integrated circuit (I2C) protocols and other serial bus protocols. Simple RFID devices do not generally support physical sensors directly. More complex devices can be built using an RFID front end, an integrated MCU and one or several sensor(s) and/or other peripheral devices. In these sorts of systems, the MCU generally imposes a severe restriction on the overall power usage of the wireless sensor system. Many available sensors support SPI or other serial interface standard capability, but require a MCU as the bus master in the system to control the sensor(s) and collect the results. While integrating the MCU with the RFID may be a worthwhile step in system reduction, it does not address concerns with overall operating power.

Referring to FIG. 26, in one embodiment, RFID tag 2600 incorporates a configuration of two state machines 2608 and 2610 in which SPI master state machine 2610 is to obviate the need for a standalone MCU. In the following description, SPI bus is adopted as an example but similar configuration may be applied to other types of serial buses. In one embodiment, RFID control state machine 2608 performs similar functions as state machine 420 as described in FIG. 4 and SPI master state machine 2610 is designed to carry the burden of the bus master and thus provides a more cost effective (area and power) solution than a complete integrated/embedded MCU. Referring to FIG. 26, RFID tag 2600 includes an antenna to collect RF energy and the energy is accumulated by energy harvester block 2604 and in turn to power RFID tag 2600 and/or slave/peripheral devices [not shown]. In one embodiment, RX and TX logic block 2606 receives a series of commands from RFID reader [not shown] through an RFID interface [not shown]. RX and TX logic block 2606, coupled to RFID control state machine 2608, processes the commands. The RFID control state machine 2608 then maps a sequence of intended SPI master commands into NV memory block 2602. In one embodiment, NV memory block 2602 includes non-volatile memory such as SONOS, flash memory and/or FRAM. Since NV memory block 2602, such as FRAM which is used as an example in this embodiment, is non-volatile, the memory such as mapped SPI master commands do not need to be re-populated at every power cycle. In one alternative embodiment, volatile memory may be included and/or replace NV memory block 2602. In one embodiment, when the power level is deemed sufficient for an operation, RFID control state machine 2608 wakes up SPI master state machine 2610 which in turn retrieves, reads and responds to instructions such as SPI master commands which were already mapped into the NV memory block 2602. This configuration allows an operational mode that RFID tag 2600 wakes up from incident RF power and is capable to immediately execute the stored SPI master commands. After SPI master state machine 2610 retrieves the commands, it conveys commands from NV memory block 2602 to SPI port 2612 by sequencing appropriately for a specific slave (peripheral) device. As discussed, SPI port 2612 can be replaced with DSPI port, I2C port or other serial bus protocols according to system design. In this way, any slave device may be supported by simply reprogramming NV memory block 2602 on the RFID tag 2600 without a MCU as the bus master. In one embodiment, SPI master state machine 2610 conveys the instruction(s) to a peripheral SPI slave, using the same internal clock source or a divided version as is used to support the RFID protocol. SPI master state machine 2610 is coupled to peripheral SPI slave device(s) via SPI port 2612 which may include chip select pin(s) (/CS), SCK (serial clock) pin, MOSI (master output slave input) pin and MISO (master input slave output) pin. In one embodiment, buses coupled to SPI port 2612 may be bidirectional as the system requires. In one embodiment, multiple slave devices can be supported by incorporating an additional discrete /CS pin for each and additional GPIO pin(s) may be incorporated for other purposes such as providing power control to slave device(s). In one embodiment, the instructions conveyed to slave device(s) may issue commands/instructions to the selected slave device to take some action, and the result of that action may be conveyed back to SPI master state machine 2610 on a subsequent master command/instruction. A simple example of these transactions is best shown in FIG. 28 and its corresponding description in later sections.

In one embodiment, SPI port 2612 and master state machine 2610 may also be used as a slave input interface to RFID tag 2600 shown in FIG. 26 to support dual-port access to NV memory 2602 for test, programming, or any other purpose. In one embodiment, in the event that the command from RFID reader is an interrupt command, SPI master state machine 2610 may perform functions resembling interrupt manager 1910 as best shown in FIG. 19A and the corresponding description to grant intermittent NV memory block 2602 access to slave/peripheral devices. The mechanism may incorporate the RFID interrupt operation that is described in earlier sections.

Figure 27:
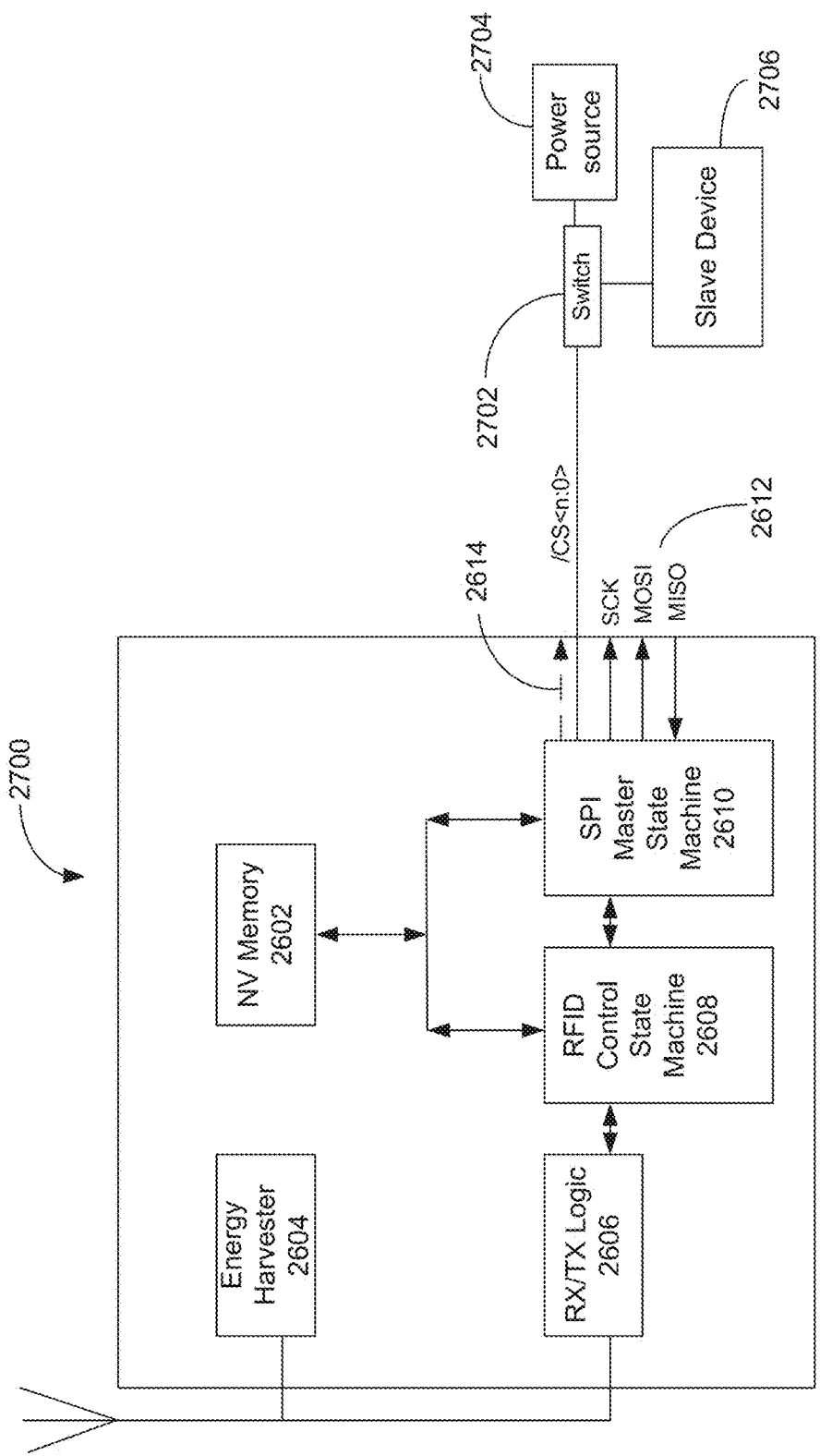
FIG. 27 is a block diagram of one embodiment of an embedded FRAM memory based RFID, including a SPI master/slave interface and power control of slave device(s).

FIG. 27 is a block diagram of one embodiment of an embedded FRAM memory based RFID application of the present invention, including a SPI master/slave interface and power control of slave device(s). In one embodiment, instruction signals conveyed to a selected slave device 2706 may include a control signal which may be used to control a power switch. The control signal may be a high-going signal resembling the interrupt signal shown and described in FIGS. 22-23 or a low signal in a conventional SPI operation via either /CS pin of SPI port 2612 or an additional GPIO pin 2614. In one embodiment, control signal may be applied to the gate of switch 2702 to turn it on, which allows slave device 2706 access to operating power from power source 2704. In one embodiment, power source 2704 may be RFID tag 2600 or a standalone power source such as batteries. With the power control mechanism, peripheral device(s) such as slave device 2706 may be unpowered or in a sleep mode to reserve power and is only woken up by SPI master commands via SPI port 2612.

Figure 28:
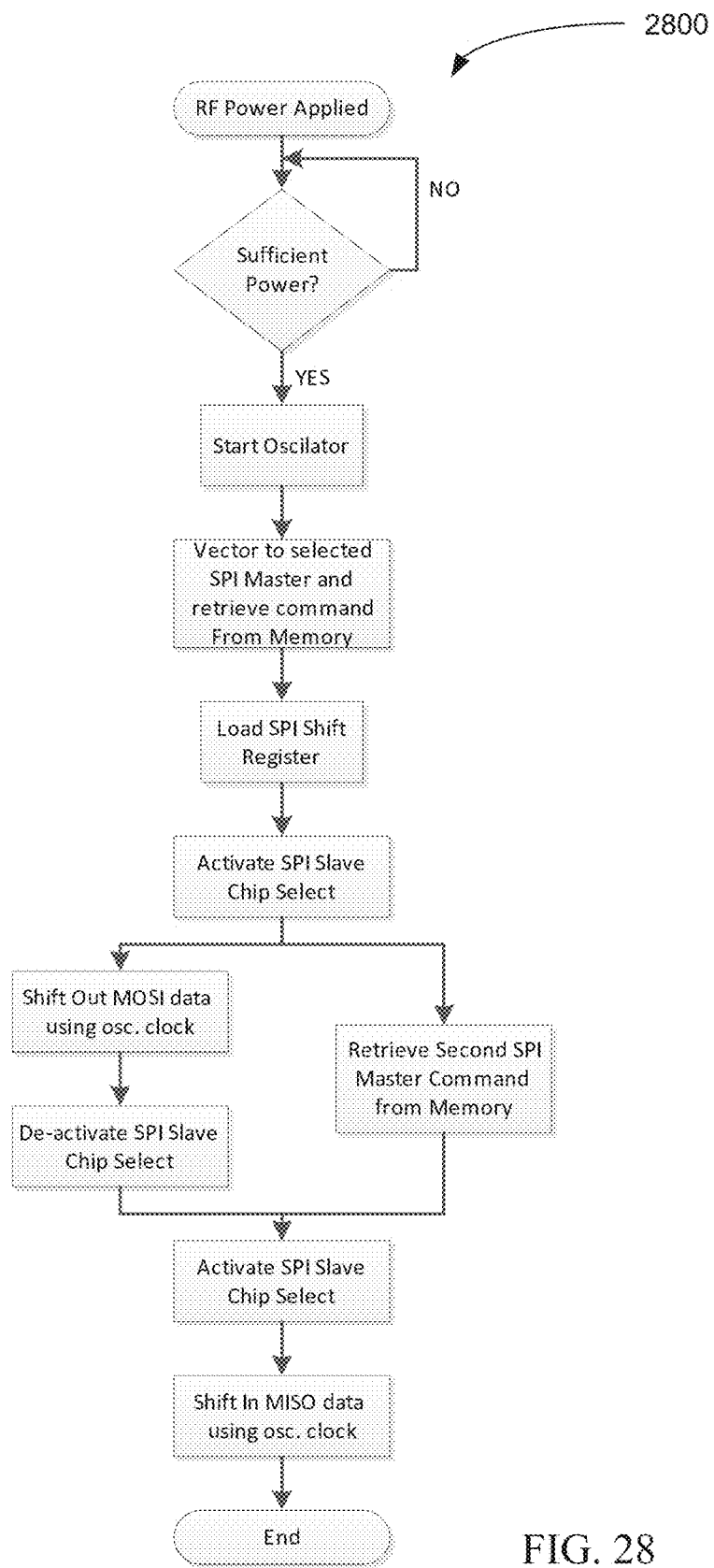
FIG. 28 is a flow chart for performing a master command according to an embodiment of the invention.

FIG. 28 is a flow chart illustrating one embodiment of steps for performing a master command. In one embodiment, RFID tag 2600 is woken up when it is in range of an RFID reader. It will then check if sufficient operating power is harvested and start the oscillator to generate master clock signal. Subsequently, RFID control state machine 2608 may receive a sequence of commands from the RFID reader, map each of the commands to NV memory block 2602 and wake up SPI master state machine 2610. SPI master state machine 2610 may then retrieve commands from NV memory 2602 including vector data (or addresses) for selecting a particular slave/peripheral device. A control signal will then be sent to the selected slave device 2706 via its corresponding chip select pin and/or an additional GPIO pin 2614. The control signal that initiates an action to the selected slave device 2706 may also be used to turn on power supply to the selected slave device 2706. In one embodiment, the control signal may be an interrupt signal as described in FIG. 19A if the command is an interrupt command. Subsequently, the first command may then be shifted out from NV memory 2602 to the selected slave device 2706 via SPI master state machine 2610 at MOSI according to the master clock and the selected slave device 2706 will then be deactivated. Simultaneously, a second command may be shifted out to SPI master state machine 2610. The selected slave device 2706 may then be activated again by another control signal and data from the selected slave device 2706 will then be shifted into NV memory 2602 via SPI master state machine 2610 at MISO pin according to the master clock. The process 2800 may either end or continue on to execute the second command.

Figure 29:
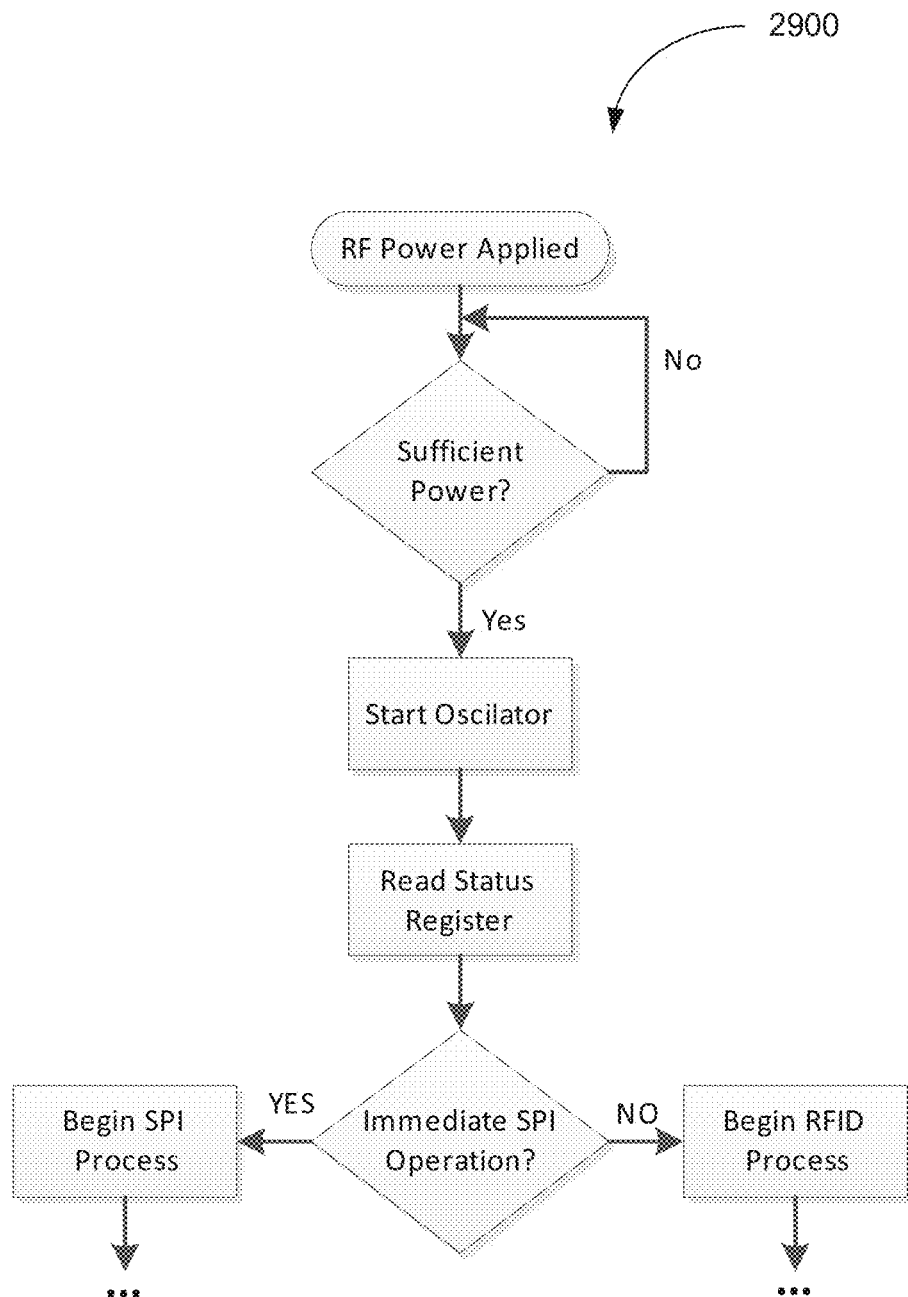
FIG. 29 is a flow chart for selection of SPI process or RFID process according to an embodiment of the invention.

FIG. 29 is a flow chart illustrating one embodiment of steps for selection of SPI process or RFID process. A key part of any RFID system is necessity of waking up, reading and responding to the incoming protocol such as commands from RFID reader. In one embodiment, these key functions may be managed simultaneously with the tasks of the SPI master process 2800. However, it may not be desirable for a couple of reasons. First, RFID system such as RFID tag 2600 is generally ultra-low power circuits, and having two simultaneous operations may drain too much energy. Second, a system designer may wish to prioritize these operations to best suit the tasks. For instance, users might wish to simply cause a new sensor reading to take place and be stored in memory, without the overhead of processing the RF protocol. On the other hand, users may consider sensor readings to be rare, command based events, with higher importance placed on fundamental RFID operations. Referring to FIG. 29, when SPI master state machine 2610 wakes up and has the initial access to NV memory 2602, it reads a non-volatile status register which has been pre-loaded by the system application. The reading of the status register may start early in the power-on sequence of RFID tag 2600. In one embodiment, one bit of the status register may be used to give priority to either RFID operation or SPI master operation or both.

FIG. 30 is a timing chart of one embodiment of SPI timing and a memory structure table for a single SPI device. The command structure may be flexible, but should have some typical characteristics. In one embodiment, SPI master state machine 2610 must know the number or depth of the master commands and when to stop interfacing with the selected slave device. Moreover, SPI master state machine 2610 must know deterministic memory locations for shared data (results). In one embodiment, in order to support multiple slave devices, these structures should be relocate-able and not rely on fixed addresses. There are several possible ways to keep track of the depth of master commands. In one embodiment, a static code word may be used as a STOP condition. The advantage of such embodiment is the simplicity and the code word is applicable to most RFID systems. However, the static code word may collide with an operating code or data for some SPI slave devices. In another embodiment, a length parameter, such as the number of master commands before the STOP condition, in one of the memory locations may be used for control. In yet another embodiment, a user specified code may be used to denote the STOP condition. In one embodiment, the user specified code may be located at the same address as the status register along with the startup priority bit, and when a matching code is received in a subsequent location, the state machine would halt.

SPI does not limit the word length to 8 bits, but that is very common and will be adopted as an example in SPI timing chart 3000 and memory structure chart 3010 for illustration purposes only. In one embodiment, the EPC Gen2 protocol deals with memory in 16 bit word sizes. Also, SPI supports full duplex data communications via the MOSI and MISO pair of pins. In one embodiment, these features of SPI protocols allow for a compact command/data exchange protocol between SPI master state machine 2610 and slave devices. It is imperative to note that other serial bus protocols such as DSPI and I2C may also support these features.

Referring to SPI timing chart 3000 which shows SPI command signaling, control signal via CS pin goes low to initiate SPI master/slave communication and one data bit is shifted at the rising edge of master clock signal. In one embodiment, other configurations such as a high-going control signal via CS pin and/or a GPIO pin and using both the rising and falling edge to shift one bit of data may be adopted according to the RFID system design.

Referring to memory structure chart 3010 for one slave device operation, the sequence of operations of one embodiment as follows:

1. The starting address (Addr n) is read and the initial 8 command bits (SPI Master 0) are retrieved and shifted out on MOSI to a selected slave device. SPI master state machine 2610 may learn which slave device to engage in a multi-slave device system and/or whether a SPI master operation should be initiated immediately from "Status" bits at the starting address.

2. As every SPI master command 0 bit is shifted out via MOSI to SPI master state machine 2610, 8 data bits (SPI data 0) are captured on the MISO line from the selected slave device 2706. These may or may not be meaningful data bits, depending on the previous command i.e. SPI master 0.

3. When the next address (Addr n+1) is read, the next 8 command bits (SPI master 1) are read. In the case of FRAM, the read is destructive and must be written back. In one embodiment, the upper byte (bits 15-8) of the 16 bit word may be utilized to store the MISO bits from the previous operation (SPI data 0).

4. SPI master state machine 2610 continues the operation until it reads stop code at Addr n+4. SPI master state machine 2610 may then stop communications with the selected slave device 2706 and write the last SPI data e.g. SPI data 3 to the upper byte at Addr n+4. In another embodiment, a length parameter, such as 4 in this example, may be stored at Addr n as part of the status code. SPI master state machine 2610 may execute 4 commands and stop automatically.

Referring to the embodiment best shown in FIG. 30, a total of 4 SPI master commands (0-3) may be sent to selected slave device 2706 before the STOP code is recognized. In one embodiment, master commands, which may include a data playload, may be of any nature which is appropriate for the target device. When the RFID reader subsequently retrieves the result from NV memory 2602, it will target whichever of the address locations that have meaningful data. Since there is no data associated with the initial command byte at Addr n, the system can use that address location for status, vector signal, sequence of RF and Master/Slave operations and/or other purposes.

A typical SPI Master such as SPI master state machine 2610 has the capability of supporting more than one slave devices. In one embodiment, RFID tag 2600 may be programmed at the factory to support numerous slave devices in the field, but only one in a given installation, or more than one at a time, such as a Real Time clock along with a temperature sensor. The latter case would require additional I/O pins for Chip Select functionality. In order to support multiple slave devices, RFID tag 2600 is capable of enabling multiple sets of master commands. In one embodiment, each slave device may be associated with a particular starting address such as Addr n+1, this is enabled by using a starting vector which may be stored as part of the status code in the initialization stored at Addr n.

As discussed, most current wireless sensors are made from a combination of a wireless interface, a low power MCU and sensor unit(s) (peripheral device). The combination of sensor(s) and an embedded MCU need a local energy source which also adds cost and maintenance requirements. In one embodiment, the incorporation of a SPI master state machine instead of an embedded MCU may help RFID chip such as RFID tag 2600 to be entirely powered by RF field provided by RFID readers. Although peripheral sensor(s) may generally still require a power source, it can be chosen to be smaller & cheaper, or extend the lifetime. In one embodiment, if MCU is required for the RFID system, a peripheral MCU may be incorporated, coupled and configured as described in FIGS. 19A and 24. The peripheral MCU 2412 may be woken up and granted intermittent/temporary memory access with an interrupt signal to execute operations as required.

Figure 31A:
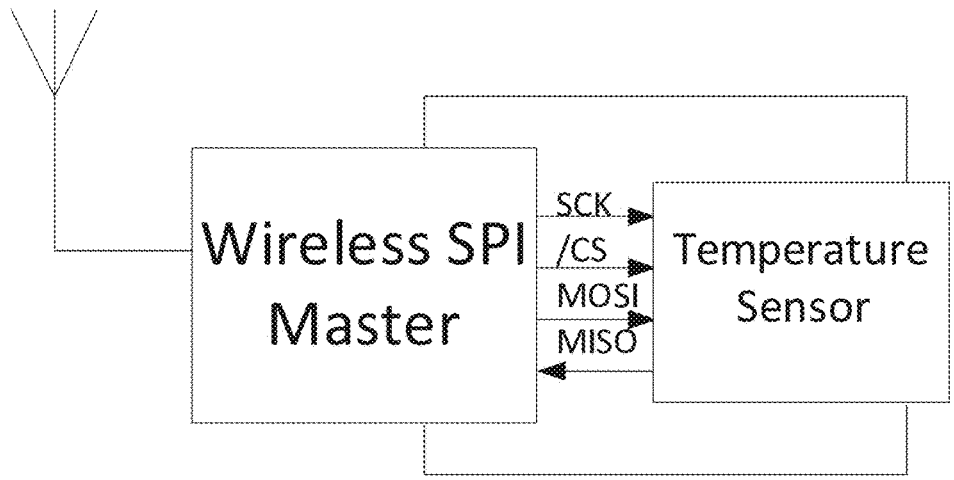
FIGS. 31A and 31B are block diagrams of embodiments of an embedded FRAM memory based RFID, including alternative power sources.
Figure 31B:
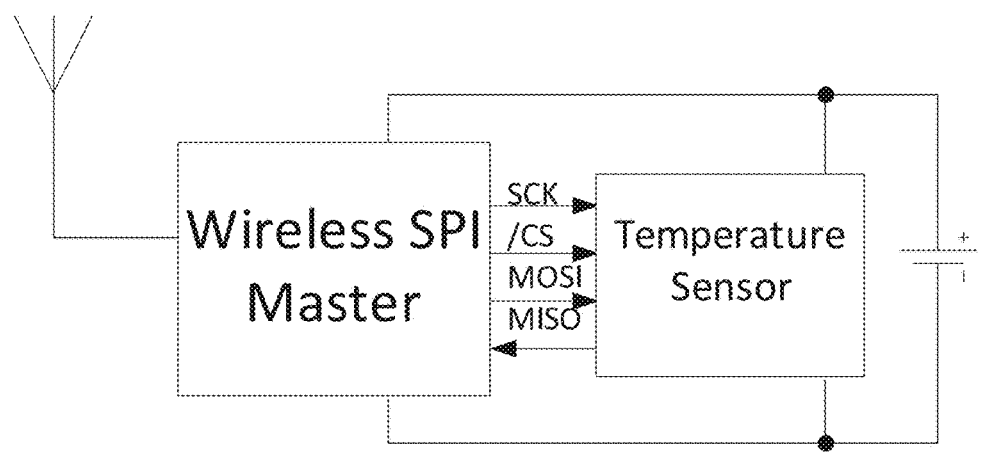

In practice, the Wireless SPI Master would be programmed with an instruction set(s) to support a given sensor(s). These elements would be combined on a PCB along with an RF antenna and sensor power source and this assembly would be mounted at a point of interest for data collection. With regard to the system configuration having a SPI master state machine instead of an embedded MCU, two important modifications may be made. First, as shown in FIG. 31A, it is conceivable to use the energy harvester of RFID tag to also power the sensor. This comes at the cost of operating range of the RFID system, but can be done as a system level choice. The second alternative is best shown in FIG. 31B in which battery power is also made available to the sensor. This is generally referred to as BAP (battery assisted passive) operation and sometimes as semi-passive. The configuration may extend the operating range of the sensor system, but will have a cost in terms of reduced battery life. Since the Wireless device is designed to be very low power, the power cost to the system can be quite small, depending on the characteristic of the sensor.

It will be apparent to those skilled in the art that various modifications and variation can be made in the present invention without departing from the spirit or scope of the invention. As would be apparent to those skilled in the art equivalent embodiments of the present invention can be realized in firmware, software, or hardware, or any possible combination thereof. In addition, although representative block diagrams are shown for an aid in understanding the invention, the exact boundaries of the blocks may be changed and combined or separated out as desired for a particular application or implementation. Finally, although FRAM memory is described and claimed, the present invention is also applicable to any other high speed non-volatile memory technology. Thus, it is intended that the present invention cover the modifications and variations of this invention provided they come within the scope of the appended claims and their equivalents.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A circuit, comprising:
   a memory;
   a radio frequency identification (RFID) interface;
   a first processing element coupled to the RFID interface, wherein the first processing element receives RFID commands through the RFID interface and maps the RFID commands directly to the memory;

a second processing element coupled to the first processing element, wherein the second processing element retrieves the RFID commands from the memory; and a serial interface configured to be coupled to at least one peripheral device, wherein a first peripheral device selected from the at least one peripheral device receives the RFID commands from the second processing element through the serial interface, wherein the RFID commands include a control signal configured to allow the first peripheral device to gain access to operating power;

a memory access control circuit coupled to the memory and the serial interface; and an interrupt manager coupled to the memory access control circuit, the RFID interface, and the serial interface, wherein at least one of the RFID commands is an interrupt command, the interrupt manager is configured to receive the interrupt command which allows the first peripheral device selected from the at least one peripheral device to gain access to the memory and the operating power, and the first peripheral device is configured to acknowledge the interrupt command through the serial interface, the interrupt manager is further configured to receive a termination command from the first peripheral device through the serial interface, disable the serial interface, and re-enable the RFID interface.

2. The circuit of claim 1, wherein the first and the second processing elements are state machines.

3. The circuit of claim 1, wherein the memory comprises non-volatile (NV) memory.

4. The circuit of claim 3, wherein the serial interface is selected from a group including:

Serial Peripheral Interface (SPI), Dual Serial Peripheral Interface (DSPI), and Inter-Integrated Circuit (I2C).

5. The circuit of claim 1, wherein the first peripheral device, includes a sensor, is configured to write first data to the memory through the serial interface in response to the RFID commands.

6. The circuit of claim 1, wherein the interrupt manager is further configured to:

at least power the first peripheral device or control a power switch of the first peripheral device;

enable the first peripheral device to access the memory through the serial interface;

disable the RFID interface from accessing the memory; and disable all of the at least one peripheral device except the first peripheral device from accessing the memory.

7. The circuit of claim 1, wherein the interrupt manager is a part of the second processing element and wherein the first peripheral device includes a microprocessor.

8. The circuit of claim 1, wherein selection of the first peripheral device from the at least one peripheral device is based on the interrupt command that includes a plurality of write commands of two trigger data to two trigger addresses in the memory.

9. The circuit of claim 1, wherein the interrupt command includes one custom interrupt generation (INTGEN) command received through the RFID interface, wherein the INTGEN includes a data payload enabling a selection of the first peripheral device from the at least one peripheral device.

10. A method, comprising:

receiving RFID commands by a first processing element through a RFID interface;

mapping the RFID commands to memory by the first processing element;

waking up a second processing element;

retrieving the RFID commands by the second processing element, wherein the second processing element is configured to be coupled to at least one peripheral device through a serial interface;

selecting a first peripheral device from the at least one peripheral device based on the RFID commands; and sequencing and conveying the RFID commands to the first peripheral device through the serial interface, wherein the RFID commands include a control signal configured to turn on operating power to the first peripheral device.

11. The method of claim 10, further comprising:

writing first data to the memory by the first peripheral device through the serial interface, wherein the first peripheral device includes a sensor and the writing the first data is in response to the RFID commands.

12. The method of claim 10, wherein the first and the second processing elements are state machines and the memory includes non-volatile (NV) memory.

13. The method of claim 10, wherein one of the RFID commands is an interrupt command, further comprising:

initiating an interrupt operation with the interrupt command which includes writing two trigger data to two trigger addresses in the memory;

receiving the interrupt command by an interrupt manager;

selecting the first peripheral device from the at least one peripheral device based on at least one of the two trigger data and the two trigger addresses;

sending an interrupt signal to the first peripheral device through the serial interface;

receiving an acknowledge signal from the first peripheral device through the serial interface;

disabling the RFID interface and all of the at least one peripheral device except the first peripheral device from accessing the memory;

enabling the first peripheral device to access the memory through the serial interface;

receiving an interrupt end command through the serial interface; and re-enabling the RFID interface to access the memory and disabling the serial interface.

14. The method of claim 13, further comprising:

configuring the interrupt signal to at least one of:

control a power switch of the first peripheral device, power the first peripheral device, be one of signal inputs of the first peripheral device, and be a control input of the first peripheral device.

15. The method of claim 13, wherein the first peripheral device includes a microprocessor and is only powered during the interrupt operation, wherein the first peripheral device is configured to generate and send the acknowledge signal through the serial interface as part of its boot routines.

16. The method of claim 13, wherein the selecting the first peripheral device including:

performing an exclusive-or (XOR) operation on the two trigger data; and comparing an XOR operation result to a plurality of preset values, wherein each of the preset value is corresponding to one of the at least one peripheral device, wherein the first peripheral device is selected if its corresponding preset value matches the XOR operation result.

17. The method of claim 13, wherein the selecting the first peripheral device including:

performing an exclusive-or (XOR) operation on the two trigger data;
comparing an XOR operation result to a preset value; and
comparing the two trigger addresses to a plurality of preset address pairs, wherein each of the preset address pairs is corresponding to one of the at least one peripheral device, wherein the first peripheral device is selected if its corresponding preset address pair matches the two trigger addresses and the preset value matches the XOR operation result.

18. A device, comprising:
a memory;
an RFID interface including primary access to the memory;
a serial interface including intermittent access to the memory triggered by an interrupt command, wherein the serial interface is configured to be coupled to at least one slave device; and
a master state machine coupled to the memory and the serial interface, wherein the master state machine is configured to:

retrieve RFID commands from the memory, wherein the RFID commands are received through the RFID interface;
sequence and convey the RFID commands to a first slave device selected from the at least one slave device when none of the RFID commands is the interrupt command, wherein the first slave device writes first data to the memory through the serial interface in response to the RFID commands; and
generate an interrupt signal based on the RFID commands when at least one of the RFID commands is the interrupt command, the interrupt signal is sent to the first slave device selected from the at least one slave device, wherein the master state machine is further configured to receive an acknowledge signal and a termination command from the first slave device through the serial interface, wherein selection of the first slave device is based on the RFID commands.

* * * * *